(12) United States Patent
Varnica et al.

(10) Patent No.: US 8,059,763 B1
(45) Date of Patent: Nov. 15, 2011

(54) APPROXIMATE SOFT-INFORMATION COMPUTATION IN MULTI-LEVEL MODULATION SIGNALING SCHEMES

(75) Inventors: Nedeljko Varnica, Sunnyvale, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 920 days.

(21) Appl. No.: 11/936,531

(22) Filed: Nov. 7, 2007

Related U.S. Application Data

(60) Provisional application No. 60/865,050, filed on Nov. 9, 2006.

(51) Int. Cl.
*H04L 27/06* (2006.01)

(52) U.S. Cl. .................................................. 375/341

(58) Field of Classification Search .................. 375/262, 375/265, 341; 704/242; 714/795, 792
See application file for complete search history.

(56) References Cited

U.S. PATENT DOCUMENTS

2002/0122510 A1* 9/2002 Yakhnich et al. .............. 375/342
2007/0291864 A1* 12/2007 Ma et al. ........................ 375/262
* cited by examiner

*Primary Examiner* — Sam K Ahn

(57) ABSTRACT

Apparatus and methods are provided for calculating soft information in a multi-level modulation scheme using one or more nearest neighbors. The nearest neighbors correspond to signal points in a signal constellation set nearest to the value of a received signal. For the nearest neighbors of a received symbol of information, a detector can determine whether the nearest neighbors have a same bit value at a bit position of the symbol. When the bit values are the same at that bit position, soft information in the form a log-likelihood ratio can be computed based on the nearest neighbors and a predetermined scaling factor. The predetermined scaling factor can be optimized for system performance.

45 Claims, 18 Drawing Sheets

APPROXIMATE SOFT-INFORMATION COMPUTATION IN MULTI-LEVEL MODULATION SIGNALING SCHEMES

CROSS-REFERENCE TO RELATED APPLICATION

This claims the benefit under 35 U.S.C. §119(e) of U.S. Provisional Application No. 60/865,050, filed Nov. 9, 2006, which is incorporated herein by reference in its entirety.

BACKGROUND

This invention relates generally to signal detection, and more particularly to calculating soft information for a signal obtained from a multi-level modulation system.

With the continuing demand for higher-speed digital communications systems and higher-density digital storage systems, various techniques have been applied to increase the capacity of these systems. However, even with high-capacity communications and storage media, their respective bandwidths and densities are still limited. Therefore, multi-level signaling can be applied to fully utilize the available bandwidth or density of these systems. For example, rather than binary signaling, e.g., 2-PAM, some communications system can increase the amount of information transmitted by using four signal levels, e.g., 4-PAM.

However, determining the information contained within a received signal of a multi-level system may be a complex problem. In particular, at each time interval, a received signal may correspond to a plurality of different digital information sequences, or "symbols." Typically, to determine the actual symbol corresponding to a time interval of the received signal, soft information can be computed for each bit of the symbol. The soft information can correspond to the likelihood that a particular bit in the symbol is "0" or "1." Soft information for the bits of a symbol are typically computed based on each possible value of the symbol. Because there can be many possible symbol values to consider in multi-level modulation schemes, computing soft information at each time interval can require a large amount of high-complexity computational circuitry. Furthermore, because these likelihoods may need to be computed frequently, the computational circuitry may also have high power consumption. Accordingly, it would be desirable to provide low complexity and low power techniques for calculating soft information in systems with multi-level modulation.

SUMMARY

Systems and methods are provided for calculating soft information in a multi-level modulation scheme using low complexity computations.

Digital information from a digital storage or communications system is preferably communicated using a signal modulated according to a multi-level modulation scheme. That is, to provide a signal representing digital information, a modulator can group bits of the digital information into symbols. To convert the symbols of the digital information into a signal, the modulator preferably uses a signal constellation set corresponding to the multi-level modulation scheme. The signal constellation set preferably includes a plurality of signal points, where each signal point has an associated magnitude/phase and an associated symbol. Thus, the modulator can modulate the symbols of the digital information based on the magnitude and phase of a signal point in the constellation set corresponding to each symbol.

A signal received from the modulator may be affected by noise, such as noise that can be modeled as additive white Gaussian noise (AWGN). To interpret the noisy received signal, one or more detectors/decoders can be used to recover the original digital information. The one or more detectors preferably compute soft information in the form of a log-likelihood ratio (LLR) for each bit of the digital information. To compute a full-precision exact log-likelihood ratio for a received signal, the value of the received signal may need to be compared to each signal point in the multi-level constellation set. This computation may be overly complex, especially because signal points in the signal constellation set that are not close to the magnitude and phase of the received signal are very unlikely to correspond to the original digital information. Therefore, the present invention provides techniques for calculating soft information based on a subset of signal points for each received symbol that are most likely to correspond to the actual transmitted symbol. The signal points in this most likely subset may be referred to as nearest neighbors.

In accordance with one embodiment of the present invention, soft information can be computed for a digital information sequence based on nearest neighbors. The soft information preferably is computed by a detector coupled to a channel, such as a storage channel. A signal can be received that corresponds to a symbol of the digital information sequence. For the received signal, a suitable number of nearest neighbors can be found. Because a multi-level modulation scheme is used, the symbol preferably includes information on multiple bits of the digital information sequence. For each bit position of the symbol, a determination can be made as to whether the nearest neighbors correspond to symbols having a same bit value for the bit position. If the bit value is the same, soft information can be calculated for that bit of the digital information sequence based on a first process. The first process may involve computing the soft information using a predetermined scaling factor. The scaling factor can be predetermined based on the multi-level modulation scheme used, and can take on a value that optimizes detection performance. Otherwise, if the bit value is not the same at that bit position, soft information can be calculated according to a second process different from the first process.

In accordance with another embodiment of the present invention, soft information can be computed according to a single nearest neighbor. A signal representing a symbol of information can be received by a detector, and a nearest neighbor for the received signal preferably is found. For each bit position of the symbol, soft information for the bit position can be computed based on a first expression if the nearest neighbor has a bit value equal to "1" at that bit position, and can be computed based on a second expression if the nearest neighbor has a bit value equal to "0" at that bit position. Both equations can be based on the nearest neighbor and/or a predetermined scaling factor, as described above.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
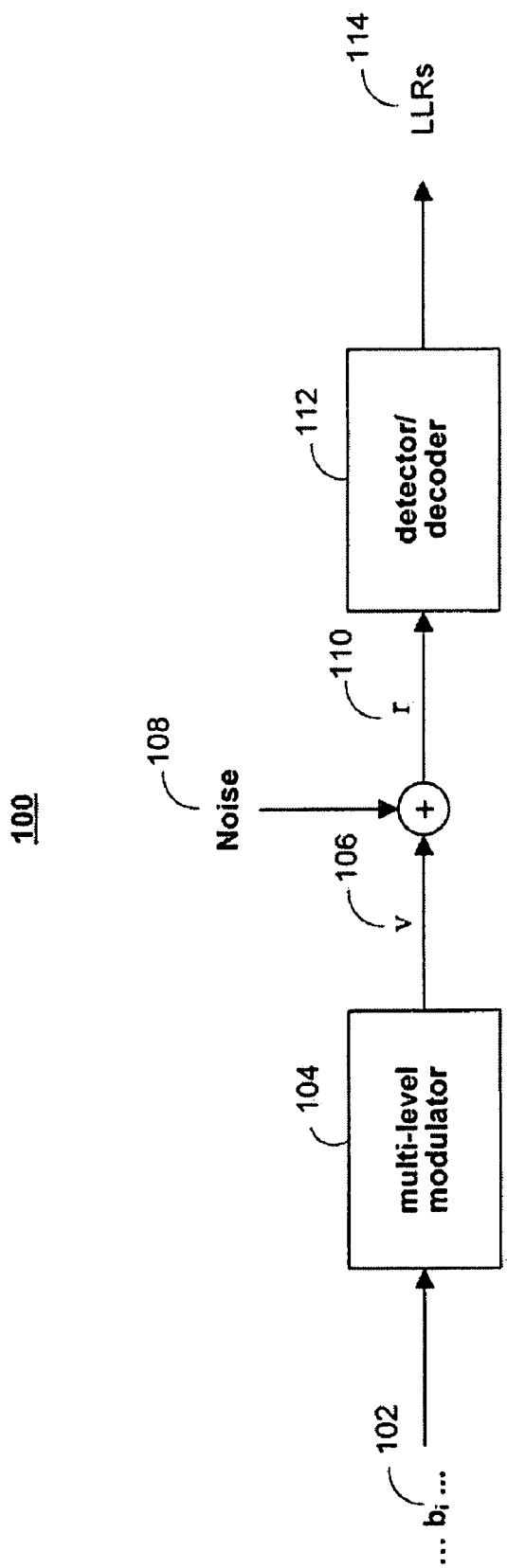
FIG. 1 shows a simplified diagram of a digital communications or digital storage system with multi-level signaling.

FIG. 1 shows illustrative system 100 of a basic digital communications or storage system. Communications or storage system 100 preferably includes multi-level modulator 104 and detector/decoder 112. Multi-level modulator 104 (discussed in detail below) preferably converts digital information 102 into signal 106, also referred to by the variable, v. Digital information 102 can represent any type of information to be conveyed (e.g., a sampled/quantized version of an analog signal, binary information, etc.) and can be in any suitable digital form (e.g., coded data, uncoded data, etc.). Digital information 102 may be supplied by any suitable digital information source. For example, the digital information source may be, but is not limited to, a source encoder, an encoder for an error correcting/detecting code (e.g., a convolutional encoder, a Reed-Solomon encoder, a CRC encoder, an LDPC encoder, a Turbo code encoder, etc.), a magnetic storage device (e.g., a hard disk), an electrical storage device (e.g., FLASH memory or RAM), or an optical storage device (e.g., a CD-ROM).

Figure 2:
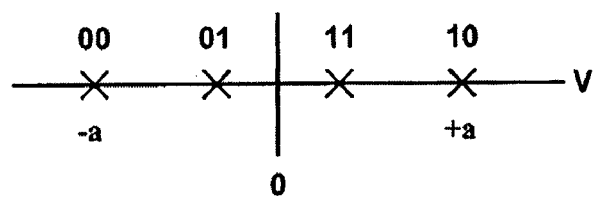
FIGS. 2-4 show illustrative signal constellation sets that may be used by the modulator and/or detector of FIG. 1.
Figure 3:
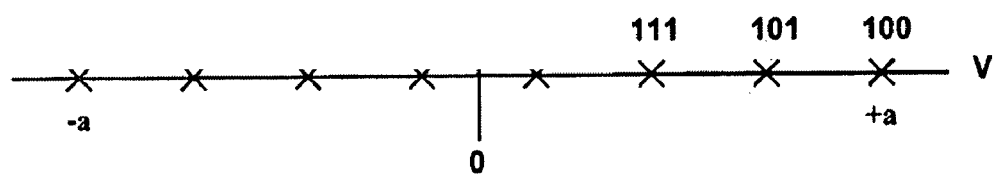
Figure 4:
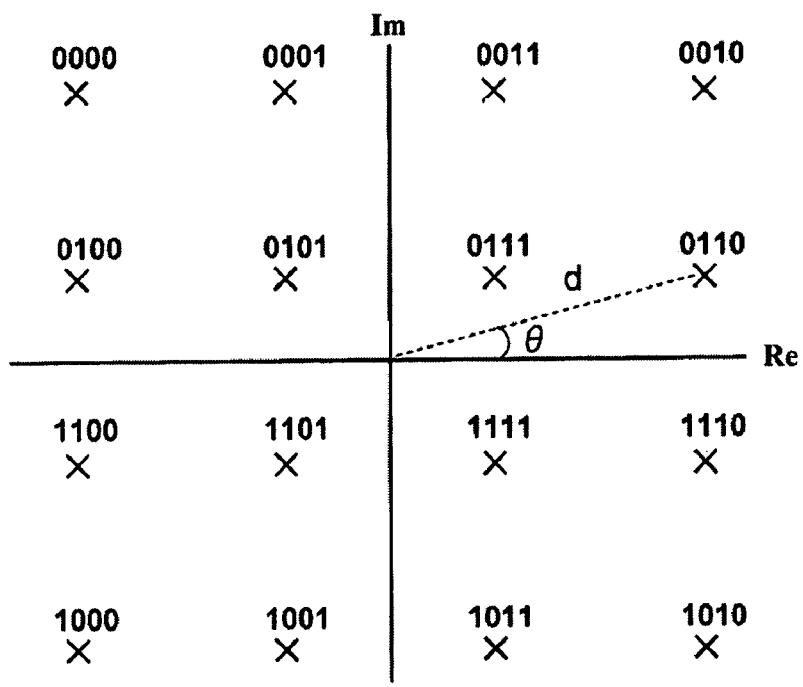

Multi-level modulator 104 preferably groups bits of digital information 102 into symbols, b, of two or more bits. Modulator 104 preferably modulates the symbol to a signal that has multiple signal levels (e.g., 4, 8, 16 levels, etc.) by adjusting the magnitude and/or phase of a suitable carrier signal. Thus, it should be understood that a "level" may refer to a particular magnitude and phase associated with a particular symbol. The level of the particular symbol can be illustrated by a signal point in a signal constellation set representing the multi-level modulation scheme. Different possible multi-level modulation schemes that can be used by modulator 104 are illustrated in FIGS. 2-4 (described below). To transmit a symbol, the carrier signal preferably is adjusted to the magnitude and phase of the signal point associated with that symbol for a period of time referred to as a "symbol period." The carrier signal may have any suitable frequency (e.g., baseband signal, passband signal, etc.) and any suitable characteristics (a non-return-to-zero (NRZ) signal, etc.). Modulator 104 can use any suitable multi-level modulation scheme, and therefore any suitable multi-level signal constellation set, for converting symbols to signals.

Referring now to FIGS. 2-4, illustrative signal constellation sets, corresponding to various modulation schemes, are shown that may be used by a modulator (e.g., multi-level modulator 104). In these figures, as well as in FIGS. 5-7, a signal point is illustrated by an "X" on a graph, and the corresponding symbol is shown above the signal point. The magnitude and phase of a signal point can be determined by its location on the graph relative to the axes.

Referring first to FIGS. 2 and 3, one-dimensional (1D) signal constellation sets of two different sizes are illustrated. These 1D signal constellation sets may correspond to pulse amplitude modulation (PAM) schemes. That is, the multiple signal levels may be provided by varying only the signal amplitude (e.g., voltage magnitude). In particular, FIG. 2 shows a 4-PAM signal constellation set for mapping two-bit symbols into four signal amplitudes. If the signal points are evenly spaced, a "00" symbol can be mapped to an amplitude of $-a$, a "01" symbol can be mapped to an amplitude of $-a/3$, a "11" symbol can be mapped to an amplitude of $+a/3$, and a "10" symbol can be mapped to an amplitude of $+a$. This symbol-to-signal point mapping is referred to as a Gray code mapping. For simplicity, a symbol-to-signal point mapping may be referred to as a "symbol mapping," and a particular symbol mapping (e.g., Gray code) may be advantageously chosen to maximize the performance of the system according to any suitable performance metric (e.g., to minimize bit error rate). A Gray code mapping may be advantageous in many situations, as this mapping uses the fewest number of bits for the size of a constellation set, and each consecutive signal point differs by only a single digit. Thus, when a received signal is incorrectly interpreted to correspond to a neighboring signal point, the resulting symbol is likely to be incorrect for only one bit.

FIG. 3 shows an illustrative 8-PAM signal constellation set that can be used by a modulator (e.g., modulator 104 of FIG. 1) for mapping three-bit symbols into eight signal amplitudes. Similar to the 4-PAM example of FIG. 2, FIG. 3 shows a Gray code mapping, though again, any other symbol mapping could be contemplated. For a maximum amplitude of a with evenly spaced signal points, the signal points of FIG. 3 can be separated by amplitudes of $2a/7$.

Referring now to FIG. 4, an illustrative two-dimensional (2D) signal constellation set is provided that can be used by a modulator (e.g., modulator 104 of FIG. 1) to modulate symbols to a signal. The 2D constellation set of FIG. 4 is shown on a complex number plane, where the horizontal axis represents real values and the vertical axis represents imaginary values. In a specific application, horizontal and vertical axis may be implemented using two orthogonal carriers, or using two independent symbol intervals. The 2D signal constellation set of FIG. 4 may correspond to a quadrature amplitude modulation (QAM) scheme with 16 signal points, referred to as a 16-QAM modulation scheme. Each symbol can include four bits, and each symbol can be modulated to a signal point having a different amplitude and/or phase. For example, symbol "0110" can be modulated to an amplitude given by distance d and phase θ. The symbol mapping of FIG. 4 shows the least significant two bits of a symbol map onto the real axis using a Gray code mapping, and the most significant two bits map to the imaginary axis also using a Gray code mapping. Any symbol mapping, including Gray code mapping or quasi-Gray code mapping, can be the symbol mapping used by a multi-level modulator. As described above, this symbol mapping is preferably selected to maximize the performance of the system. The signal constellation set of FIG. 4 may alternatively represent a (4-PAM)² constellation set, as the constellation set can be viewed as a two-dimensional, 4-points/dimension signal set.

To prevent from overcomplicating the description of the present invention, most of the examples in this description refer to modulation schemes with one dimension (e.g., the PAM schemes of FIGS. 2-3). However, it should be understood that the present invention is not intended to be limited to modulation schemes with one-dimensional signal constellation sets, and that any of the provided techniques can be extended to constellation sets of any dimension (e.g., the QAM scheme of FIG. 4). For example, the techniques described below can be extended to multiple dimensions by applying these techniques separately for each dimension of the multi-dimensional constellation set, and combining the results of each dimension. These techniques may also be extended to constellation sets for which dimensions cannot be treated independently.

Referring back to FIG. 1, modulator 104 preferably outputs signal 106 using any of the modulation schemes of FIGS. 2-4, or any other suitable multi-level modulation scheme (e.g., 32-QAM, 8-PSK, 16-PSK, etc.). Before signal 106 reaches a destination, signal 106 may be affected by additive noise source 108. Noise source 108 can have any suitable characteristics and can be noise that is or is not correlated to signal 106. In some embodiments, the noise from noise source 108 is preferably modeled by detector/decoder 112 (described below) as additive white Gaussian noise (AWGN) with zero mean and a variance of $\sigma^2$. AWGN can have a conditional probability distribution function (PDF) given by, $$AWGN_{PDF|r} = \frac{1}{\sigma\sqrt{2\pi}} \exp\left(-\frac{\|r - E[r]\|^2}{2\sigma^2}\right), \quad (1)$$

where $E[r]$ can be the value of a signal point in the signal constellation set associated with transmitted signal v. Any noise with any other noise distribution can be assumed by detector/decoder 112. However, for simplicity, it will be assumed that any additive noise affecting a signal 106 is AWGN with a distribution given by equation (1).

In addition to noise source 108, signal 106 may be attenuated or amplified by a channel (not shown). The attenuation or amplification can depend on the particular information being transmitted or stored, and can also depend on the speed of transmission or density of storage. For digital communications systems, the channel may be wired or wireless media through which the signal travels. For digital storage systems, the channel may be the media in which digital information 102 is stored. Thus, the source and the channel of a digital storage system may be the same device. To prevent overcomplicating the description of the present invention, it will be assumed that signal 106 is not attenuated or amplified by a channel. However, it should be understood that the present invention may be altered, or additional components may be added, to account for or cancel out any channel effects.

Because of additive noise source 108, signal 110 (or r) may be vastly different from the original signal, v. Furthermore, because signal 106 can have multiple levels, the signal points of the corresponding signal constellation set may be relatively close together. For example, a binary modulation system can provide signal points with amplitudes of +a and –a for a total signal separation of 2a. However, to maintain the same peak energy (e.g., the same maximum signal amplitude), an 8-PAM multi-level system may provide signal points separated by only 2a/7. Thus, any noise from noise source 108 may have a substantial effect on signal 110, and on the difficulty of accurately interpreting signal 110.

To recover digital information 102, detector/decoder 112 preferably interprets noisy signal 110. Detector/decoder 112 may include any suitable number of detectors or decoders. Detector 112 preferably determines the originally transmitted information (e.g., digital information 102 of FIG. 1) given a symbol period of noisy signal 110. In particular, for each bit in a symbol, detector 112 can determine the likelihood of that bit being a "0" or "1" in digital information 102. These likelihoods may be referred to as "soft information." In contrast, "hard information" refers to decisions of either "0" or "1" without an associated likelihood. The soft information computed by detector/decoder 112 can be in the form of a log-likelihood ratio (LLR) for each bit. The sign of an LLR preferably indicates the most likely value of a bit (e.g., most likely "0" if the LLR positive and most likely "1" if negative), and the magnitude of the LLR preferably indicates the strength or confidence of that most likely value. An LLR for a bit, $b_i$, the ith bit of digital information 102 included in received signal r, is preferably given by, $$LLR(b_i \mid r) = \log \frac{Pr(b_i = 0 \mid r)}{Pr(b_i = 1 \mid r)}. \quad (2)$$

The LLR for each bit of digital information 102 (FIG. 1), or another form of soft information, can be provided from detector/decoder 112 as output 114. The LLR calculations that detector/decoder 112 preferably performs will be discussed below in greater detail in connection with FIGS. 5-13. Using the soft information at output 114, a soft decoder for an error correcting code, such as an LDPC or Turbo decoder, may be used to correct any errors in the computed soft information.

Figure 5:
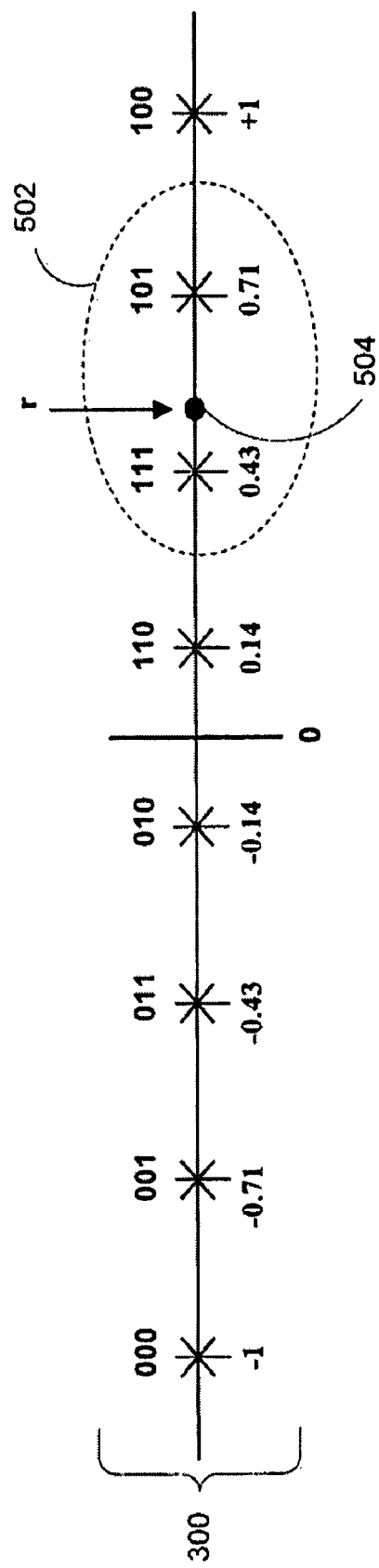
FIG. 5 shows a representation of an illustrative received signal mapped onto the constellation set of FIG. 3.

Referring now to FIG. 5, an illustrative symbol period of an 8-PAM modulation scheme is provided to demonstrate LLR calculation in various embodiments of detector/decoder 112. 8-PAM is discussed above in connection with FIG. 3. Using an 8-PAM scheme, a signal, r, may be received with an amplitude that maps r onto point 504 of graph 500. Because 8-PAM preferably is used with three-bit symbols, to calculate soft information for r, three LLRs preferably are calculated. In particular, for a transmitted or stored three-bit symbol $b=[b_2 b_1 b_0]$, an LLR can be calculated for each of bits $b_2$ (MSB), $b_1$, and $b_0$ (LSB). Using equation (2) above, the LLR for $b_1$ can be calculated according to, $$LLR(b_1 \mid r) = \log \frac{Pr(b_1 = 0 \mid r)}{Pr(b_1 = 1 \mid r)} \quad (3)$$

$$= \log \frac{Pr(b = \text{``001''} \cup b = \text{``000''} \cup b = \text{``100''} \cup b = \text{``101''} \mid r)}{Pr(b = \text{``011''} \cup b = \text{``010''} \cup b = \text{``110''} \cup b = \text{``111''} \mid r)} \quad (4)$$

$$= \log \frac{Pr(b = \text{``001''}) \mid r) + \ldots + Pr(b = \text{``101''} \mid r)}{Pr(b = \text{``001''} \mid r) + \ldots + Pr(b = \text{``111''} \mid r)}. \quad (5)$$

Notice that, as expected from equation (2), the probability associated with each possible three-bit symbol is either in the numerator or denominator of equation (4) above based on whether $b_1$ (the center bit) is a "1" or "0." LLRs for the other two bits in the symbol, $b_2$ and $b_0$, may also be computed in a similar manner as equations (3) through equation (5).

For digital communications and storage systems that can assume additive white Gaussian noise or other similar noise distributions, the value of equation (5) can be dominated by the probabilities associated with signal constellation points closest in Euclidean distance to point 504 of FIG. 5. In particular, equation (5) would be dominated by the two signal points surrounding point 504. Thus, the numerator of equation (5) would be dominated by the "101" term and the denominator would be dominated by the "111" term. To simplify the complexity of computing an LLR for k, equation (5) may be approximated by $$LLR_{approx}(b_1 \mid r) = \log \frac{Pr(b = \text{``101''} \mid r)}{Pr(b = \text{``111''} \mid r)}. \quad (6)$$

To improve the approximation, more probabilities from equation (5) can be included in equation (6). For example, two probabilities corresponding to the next two closest signal points may be added to equation (6). That is, the probabilities associated with symbols "100" and "110" could be included, resulting in an approximate LLR equation given by $$LLR_{approx}(b_1 \mid r) \cong \log \frac{Pr(b = \text{``101''} \mid r) + Pr(b = \text{``100''} \mid r)}{Pr(b = \text{``111''} \mid r) + Pr(b = \text{``110''} \mid r)}. \quad (7)$$

The closest signal points to a received signal used in calculating an LLR may be referred to collectively as the "nearest neighbors" of the received signal. For simplicity, the nearest neighbors can refer to either the signal points of a signal constellation set or to their corresponding symbol values.

Figure 6:
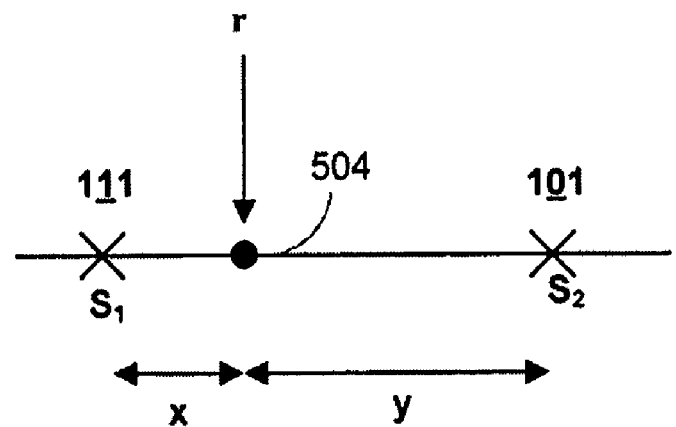
FIGS. 6 and 7 show an enlarged section of FIG. 5.

Referring now to FIG. 6, a zoomed in portion of FIG. 5 is shown including point 504 representing the amplitude of received signal r. The signal points of the two nearest neighbors may be referred to as $s_1$ and $s_2$. In FIG. 6, the distance between point 504 and its two nearest neighbors, "111" and "101," can be given by distances $x=\|s_1-r\|^2$ and $y=\|s_2-r\|^2$, respectively. In other embodiments, distances x and y may represent a distance calculation other than a squared Euclidean distance calculation. Thus, assuming the noise added to transmit signal v is from an AWGN noise source with a distribution defined in equation (1), the approximate LLR of k given by equation (6) preferably equals $$LLR_{approx}(b_1 \mid r) = \log \frac{\exp\left(\frac{-y}{2\sigma^2}\right)}{\exp\left(\frac{-x}{2\sigma^2}\right)}. \quad (8)$$

Note that the approximate LLR of equation (8) can provide significant complexity reduction compared to computing LLRs based on every symbol of the signal constellation set. In particular, fewer exponentials, which can be complex operations, are preferably calculated. Furthermore, if a natural logarithm is used in equation (8), the approximate LLR calculation can be simplified further to, $$LLR_{approx}(b_1 \mid r) = \frac{x-y}{2\sigma^2}. \quad (9)$$

Figure 7:
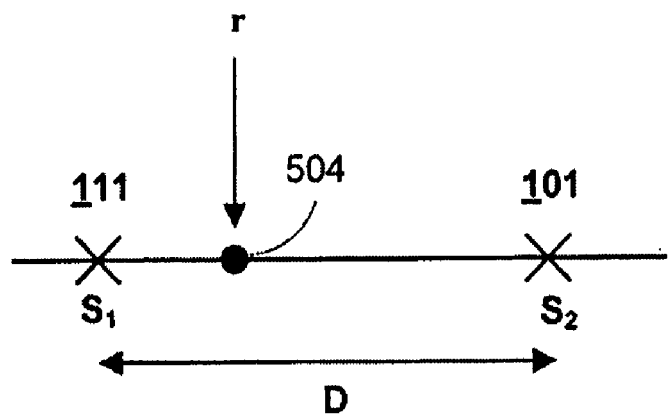

With continuing reference to FIGS. 6 and 7, the two nearest neighbors of r differ in only one bit position, $b_1$. Therefore, for bit positions $b_2$ and $b_0$, calculating LLRs using the same two signal points ("111" and "101") may not be straightforward. In particular, referring primarily to FIG. 7, the value of each of the two signal points at bit position $b_2$ (underlined for emphasis) is equal to "1" in this scenario. It would not be appropriate to utilize a similar approximation as equation (6) for this bit position, as the approximation would produce, $$LLR_{approx}(b_2 \mid r) = \log \frac{0}{Pr(b = \text{``111''} \mid r) + Pr(b = \text{``110''} \mid r)} = -\infty. \quad (10)$$

An LLR of negative infinity is undefined, and therefore does not produce any meaningful information about the value of the bit. This uninformative, undefined result would also occur if both signal points have a bit value of "0" at a bit position. Therefore, to produce useful soft information, the LLR approximation may be modified when the value of a bit position is the same for all of the nearest neighbors of a received signal.

Continuing the example of FIG. 7, when none of the nearest neighbors are associated with a symbol with a bit value of "0" for $b_2$, an approximate probability preferably is added to the numerator of equation (10). Assuming AWGN with a distribution given by equation (1), the approximate LLR for two nearest neighbors can take the form, $$LLR_{approx}(b_2 \mid r) = \log \frac{\exp\left(\frac{-S_L \cdot D}{2\sigma^2}\right)}{\exp\left(\frac{-y}{2\sigma^2}\right) + \exp\left(\frac{-x}{2\sigma^2}\right)} \quad (11)$$

$$= \log \frac{\exp(-S_L \cdot D \cdot F)}{\exp(-x \cdot F) + \exp(-y \cdot F)}, \quad (12)$$

where F is given by $$F = \frac{1}{2 \cdot \sigma^2}. \quad (13)$$

In equations (11) and (12), D represents the distance between two consecutive symbols (e.g., between $s_1$ and $s_2$ in FIG. 7), and may be given by $D=\|s_1-s_2\|^2$. The variable, $S_L$, preferably depends on the size, dimensions, and other characteristics of the modulation scheme used, and can be optimized for system performance (e.g., lowest resulting bit error rate). $S_L$ may also depend on the signal to noise ratio (SNR) in the multi-level modulation scheme. Thus, for a given modulation scheme, $S_L$ may simply be a constant. Because equation (12) does not depend on the distance between signal point 504 and a signal constellation point with $b_2=0$, an approximate LLR defined by equation (12) can be computed even if two nearest neighbors are used.

To simplify the LLR calculation of equations (11) and (12), one nearest neighbor can be removed from the calculation. Thus, the LLR calculation when the nearest neighbors have bit value of "1" for a given bit position can be simplified from equation (12) to, $$LLR_{approx(1)} = \log\frac{\exp(-S_L \cdot D \cdot F)}{\exp(-z \cdot F)} \quad (14)$$

$$= (z - L) \cdot F, \quad (15)$$

where $L = S_1 \cdot D$ and z is the squared distance to the closest of the nearest neighbors. As shown in FIG. 7, $s_1$ is closer to the received signal than $s_2$. Thus, for this example, z=x. Calculating equation (15) may be considerably less complex than computing other possible LLR equations, such as the full LLR equation shown above as equation (5). Also, as described above for equation (12), equation (15) can be computed without considering the full signal constellation set, even when the set of nearest neighbors does not include at least one symbol with a value of "1" at a particular bit position and at least another symbol with a value of "0" at that bit position. Thus, in the example of FIGS. 5-7, for bit positions $b_2$ and $b_0$, LLRs can be computed according to one of equations (12) or (15) with relatively low complexity. This example can be extended to any similar scenario, including those where the bit value for a given bit position in each nearest neighbor is equal to "0." In the scenario where all the nearest neighbors have a bit value of "0" for a given bit position, an LLR computation equation can be derived in a similar fashion as described above, resulting in an LLR computed according to, $$LLR_{approx(0)} = \log\frac{\exp(-z \cdot F)}{\exp(-S_L \cdot D \cdot F)} \quad (16)$$

$$= (-z + L) \cdot F, \quad (17)$$

It should be understood that the 8-PAM example of FIGS. 6 and 7 are merely illustrative, and that any of the equations and techniques discussed above for calculating log-likelihood ratios may be translated to any other suitable modulation scheme (e.g., 4-PAM, 32-PAM, 4-QAM, 16-QAM, 64-QAM, 8-PSK, etc.). Also, any of the equations and techniques above may be expanded to calculate log-likelihood ratios based on any number of signal points in a signal constellation set.

Figure 8:
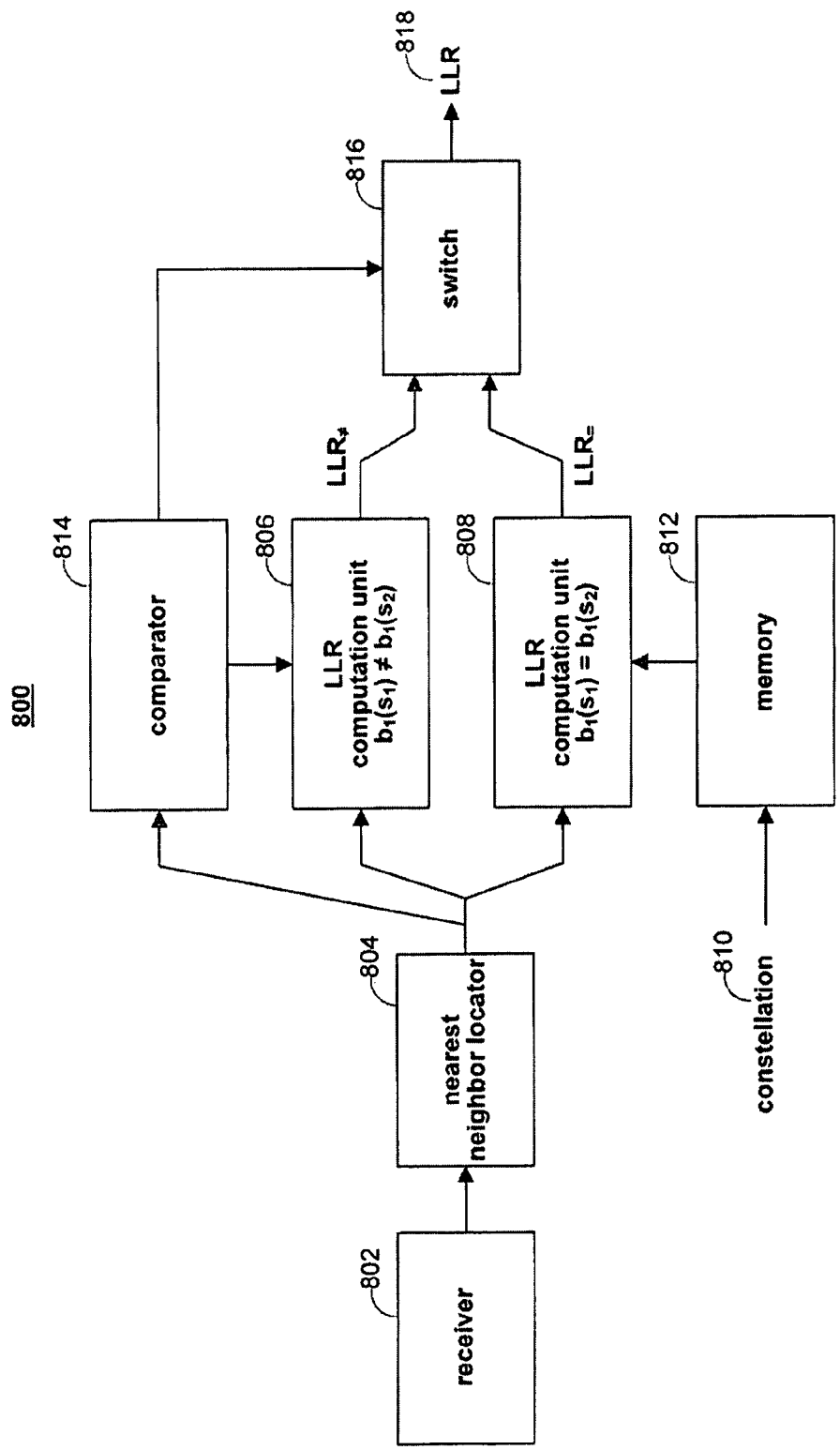
FIGS. 8 and 9 show illustrative detectors for calculating soft information based on nearest neighbors.
Figure 9:
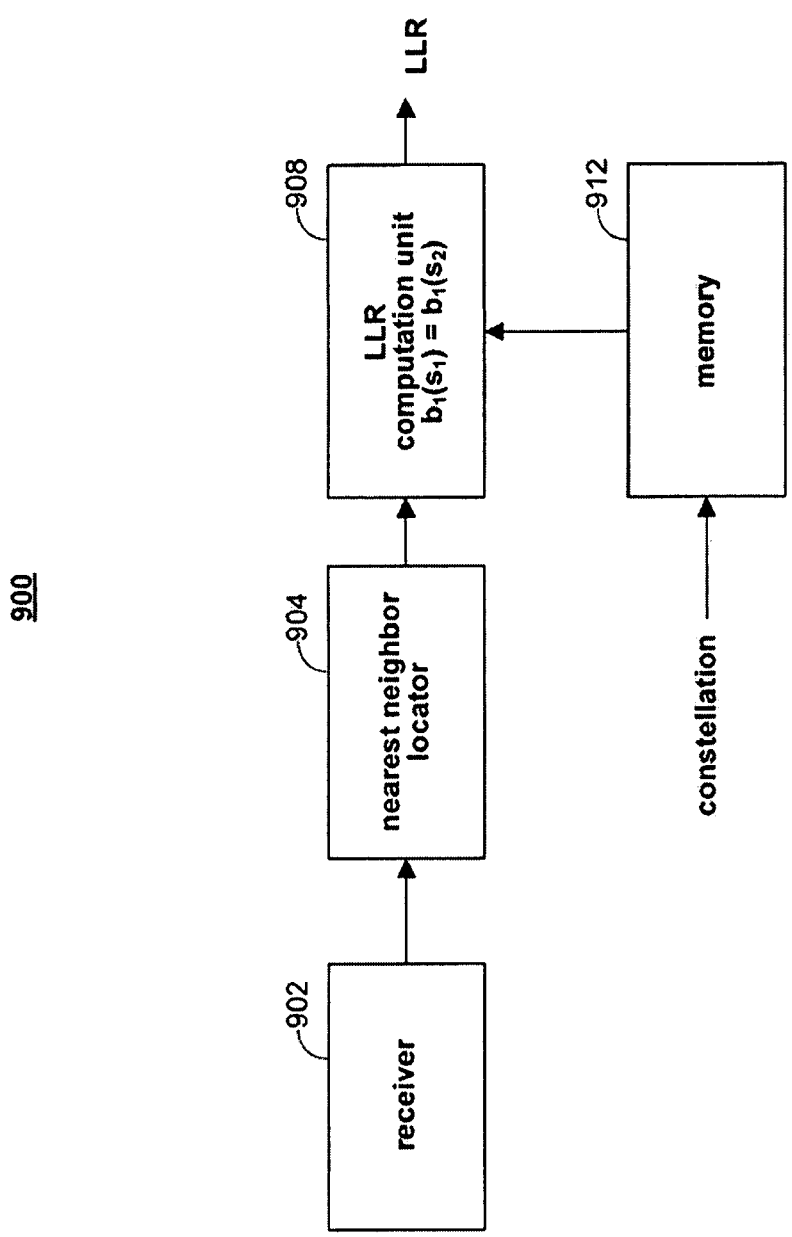

Referring now to FIG. 8, a simplified block diagram of detector 800 is shown in accordance with an embodiment of the present invention. In some embodiments, detector 800 is a more detailed view of detector/decoder 112 of FIG. 1. Detector 800 can be used to calculate soft information (e.g., LLRs) based on whether the nearest neighbors are associated with symbols that have the same value for a particular bit position. Detector 800 can include receiver 802, nearest neighbor locator 804, LLR computation units 806 and 808, memory 812, comparator 814, and switch 816, each of which will be described in greater detail below.

Receiver 802 may include any suitable circuitry (e.g., wireless antennas) for obtaining a signal. Receiver 802 may also include any ports (e.g., a serial port) or interfaces (e.g., a network interface) for coupling receiver 802 to the medium or channel through which the signal, r, is obtained. In some embodiments, receiver 802 may also include filters or other processing circuitry to, for example, reduce the effect of noise on the signal. Thus, at its output, receiver 802 may provide a signal that may or may not be same as signal r. For simplicity in describing the present invention, it will be assumed that receiver 802 provides a signal substantially equal to r to the remaining components of detector 800.

With continuing reference to FIG. 8, nearest neighbor locator 804 can find the nearest neighbors of signal r provided by receiver 802. For the example of FIGS. 5-7, nearest neighbor locator 804 can provide symbols "111" and "101," or their associated signal points, as nearest neighbors. Nearest neighbor locator 804 can determine any suitable number (e.g., 2, 4, 5, 8, etc.) of nearest neighbors, from which other components of detector 800 can use for calculating soft information. Nearest neighbor locator 804 can find nearest neighbors of the received signal using any suitable approach. In some embodiments, nearest neighbor locator 804 may find nearest neighbors by assuming that the signal constellation set uses a different symbol mapping than the one actually used by the modulator (e.g., modulator 104 of FIG. 1). This different symbol mapping may simplify the discovery of nearest neighbors. Once nearest neighbors are found in this symbol mapping, these symbols can be converted back to symbols that correspond to the actual symbol mapping used by the modulator. In other embodiments of nearest neighbor locator 804, nearest neighbors can be found by performing an exhaustive search or a binary search through the signal points of a signal constellation set. These techniques for finding nearest neighbors are described in greater detail in copending, commonly-assigned U.S. patent application Ser. No. 11/929,073, filed Oct. 30, 2007, which is hereby incorporated by reference in its entirety.

The nearest neighbors discovered by nearest neighbor locator 804 can be used by LLR computation units 806 and 808 to compute soft information. Both of these computation units may compute soft information in the form of LLRs, as defined above in equation (2) or using any similar equation. In particular, LLR computation unit 806 can be used for computing an LLR for a particular bit when the nearest neighbors include at least one symbol with a "1" at that bit position and at least one other symbol with a "0" at that bit position. LLR computation unit 806 can compute LLRs according to equations similar to equations (5) through (9). Thus, if two nearest neighbors are used in the calculation, LLR computation unit 806 may compute LLRs according to $$LLR_{approx} = (x-y) \cdot F, \quad (18)$$

where y and x are the distance variables defined above. In some embodiments, to compute these distances from a received signal to each nearest neighbor, detector 800 can additionally include a distance computation unit (not shown).

LLR computation unit 808 can compute LLRs based on the technique described above for situations when, for a particular bit position, the nearest neighbors all have a value of "0" or "1" for that bit position. In some embodiments, when two nearest neighbors are used, LLR computation unit 808 may compute LLRs according to equation (12), which is reproduced as equation (19) below for convenience:

$$LLR_{approx} = \log\frac{\exp(-S_L \cdot D \cdot F)}{\exp(-x \cdot F) + \exp(-y \cdot F)} \quad (19)$$

$$= -\log(\exp(-x \cdot F) + \exp(-y \cdot F)) - L \cdot F. \quad (20)$$

It should be understood that equations similar to equations (19) and (20) can be derived for more than two nearest neighbors using a similar strategy. In some embodiments, equation (20) can be implemented by LLR computation unit 808 using table lookup for the logarithm and exponential functions. The values for the table lookup can be stored in memory 812 of FIG. 8, which may be any suitable storage element (e.g., read-only memory (ROM), random access memory (RAM), etc.). This may be advantageous for implementations where computing logarithmic and exponential functions are complex or expensive tasks, such as for hardware implementations (e.g., ASICs, FPGAs, etc.).

In other embodiments, LLR computation unit 808 may compute LLRs according to equations (15) and (17), which are reproduced below as equations (21) and (22) for convenience:

$$LLR_{approx(1)} = (z-L) \cdot F \quad (21)$$

$$LLR_{approx(0)} = (-z+L) \cdot F \quad (22)$$

where equation (21) is used when the bit value of the nearest neighbors is equal to one, and where equation (22) is used when the bit value of the nearest neighbors is equal to zero. Note that equations (21) and (22) each lack exponential terms and a logarithmic term. These equations can therefore be computed directly with low complexity, especially in hardware implementations of detector 800 or using any other implementation where computing exponentials/logarithms may be overly complex or expensive. Also, computing equations (21) and (22) preferably removes the need for including a large storage device (e.g., a large memory 812) in detector 800.

As described above, memory 812 can be used as a lookup table that allows LLR computation unit 808 to easily and efficiently calculate soft information. Thus, continuing along these lines, memory 812 can also be used to store the values of $S_L$ and/or L for various modulation schemes. This enables LLR computation unit 808 to compute LLRs according to, for example, equations (21) and (22) above. For example, if detector 800 is configured to detect signals modulated using 8PAM, 16PAM, 32PAM, and 12PAM×12PAM, memory 812 can store the following values:

TABLE 1

| constellation | 8 PAM | 16 PAM | 32 PAM | 12 PAM × 12 PAM |
|---|---|---|---|---|
| $S_L$ | 1.65 | 1.8 | 1.9 | 2.7 |
| L | 0.1347 | 0.0320 | 0.0079 | 0.1279 |

On the other hand, if detector 800 is configured to detect signals received from a single modulation scheme, memory 812 can be used to store only one value for $S_L$ and/or L. Although $S_L$ can be derived from L, and L can be derived from $S_L$, it may be beneficial in some embodiments for memory 812 to store values for both $S_L$ and L for each modulation scheme. Otherwise, memory 812 may be used to store only one of these values for each modulation scheme. Examples of scenarios where memory 812 might store only values for L, only values of $S_L$, or values for both are described below, but should be understood to be merely illustrative.

The decision as to whether memory 812 should store values of $S_L$ or L may depend on the type of modulation scheme used. For example, detector 800 can be configured to detect signals modulated according to a multi-level modulation scheme with uniformly distributed signal points (e.g., a constellation set where $D = \|s_1 - s_2\|^2$ does not vary for different symbols). Because the distance between nearest neighbors does not change in this scenario, for a given modulation scheme, the value of L (which is based on D) may not change regardless of the value of the received signal. Accordingly, memory 812 can store only one value for L for each modulation scheme (e.g., the bottom row of Table 1). This one value would be sufficient for LLR computation unit 808 to compute soft information based on equations (21) and (22) above.

In other embodiments, detector 800 can be configured to detect signals modulated according to a multi-level modulation scheme with non-uniformly distributed signal points (e.g., a constellation set where $D = \|s_1 s_2\|^2$ varies for different symbols). In these embodiments, the value of L (which is based on D) that is used to calculate soft information may vary depending on the particular nearest neighbors associated with a received signal. Thus, memory 812 can store multiple values of L for each modulation scheme, one of which may be selected depending on the value of the received signal. Alternatively, rather than storing multiple values of L, memory 812 can stored one value for $S_L$ for each modulation scheme. Using this value of $S_L$, LLR computation unit 808 may calculate $L = S_1 \cdot D$, or another suitable scaling factor based on $S_L$, for each received symbol. The resulting scaling factor can be used in computing any of equations (20) through (22), or another suitable LLR equation.

In still other embodiments, detector 800 may be configured to detect signals modulated according to multi-level modulation schemes with both uniformly distributed and non-uniformly distributed signal points. For example, detector 800 can operate according to multiple settings, where some settings utilize modulation schemes with uniformly distributed signal points, while other settings utilize schemes with non-uniformly distributed signal points. In these embodiments, memory 812 may, for example, store values of L for use in computing soft information when modulation schemes with uniformly distributed signal points are used, and may, for example, store values of $S_L$ for use in computing soft information when modulation schemes with non-uniformly distributed signal points are used. Thus, as mentioned above, for various reasons and in various scenarios, memory 812 can be used for storing either L or $S_L$, or can be used to store both values.

LLR computation unit 808 may perform a table lookup into memory 812 to identify the appropriate value for $S_L$ or L. To perform the table lookup, memory 812 may be configured to provide a stored value based on the value of constellation selector 810. Thus, the appropriate value for $S_L$ or L may be obtained from memory 812 by controlling constellation selector 810 based on the current modulation scheme used. For example, if the values of Table 1 are stored in memory 812 and an 8-PAM scheme is currently being used, constellation selector 810 can be set to choose $S_L = 1.65$ or $L = 0.1347$, from which LLR computation unit 808 can compute equations similar or equal to equation (21) and (22), or any other suitable LLR equation.

The values of the scaling factors in Table 1 preferably are optimized for performance. In some embodiments, these values can be chosen such that the expected bit error rate of the resulting system is minimized. For example, the scaling factors can be designed to maximize detection performance in a FLASH memory system with constant peak energy for each modulation scheme. The values for the different modulation schemes can be determined in advance by, for example, running simulations and testing different possible values. In some embodiments, these scaling factors may also be adjusted adaptively while the detector is in operation. That is, the scaling factor can be set to some initial value. Then, while in operation, the detector can monitor the performance of the system, and can adjust the scaling factor in an attempt to improve the performance.

It should be understood that the values in Table 1 are merely illustrative. Memory 812 of detector 800 can store scaling factors for any suitable number of and types of multi-level modulation schemes in addition to or instead of the ones shown in Table 1. The values in Table 1 can also vary depending on the modulation scheme used (e.g., PAM, QAM, PSK, etc.), the particular system used (e.g., a storage or communications system), or the way in which the values are obtained.

With continuing reference to FIG. 8, in some embodiments, both LLR computation units 806 and 808 can compute an LLR for each bit of a digital information sequence. From the resulting LLRs, one LLR is eventually selected for each bit based on whether the nearest neighbors have the same bit value at that bit position. For an 8-PAM scheme, for example, computation units 806 and 808 can each compute three LLRs for each set of nearest neighbors obtained from nearest neighbor locator 804. Computation units 806 and 808 can compute these LLRs serially or in parallel. That is, in some embodiments, computation units 806 and 808 can each compute an LLR for a bit position, and can reuse the same circuitry (if implemented in hardware) to compute an LLR for the next bit position in a subsequent time interval. In other embodiments, computation units 806 and 808 can each include multiple copies of some circuitry such that LLRs for multiple bit positions can be computed concurrently. The particular implementation of LLR computation units 806 and 808 may depend on size and/or speed constraints/specifications of detector 800.

With continuing reference to FIG. 8, comparator 814 and switch 816 may be used to ensure that the appropriate soft information, that is $LLR_\neq$ or $LLR_=$, is provided as the output of detector 800. First, comparator 814 may determine whether, for each bit position, all of the bit values of the nearest neighbors are equal to "0" or "1." For the example of FIG. 6, comparator 814 may compare bit position $b_1$ of the nearest neighbors, and can provide an output indicating that the bit values for the nearest neighbors are not the same. For the example of FIG. 7, comparator 814 may compare bit position $b_2$ of the nearest neighbors, and can provide an output indicating that the bit values for the nearest neighbors are the same.

Using the output of comparator 814, switch 816 preferably determines which LLR, $LLR_\neq$ or $LLR_=$, to provide as final soft-bit estimate 818 for each bit of the digital information sequence. Thus, switch 816 may be modeled and implemented as a single pole double throw switch. In one state, the output of LLR computation unit 806 may be coupled to the LLR output of detector 800, and in another state, the output of LLR computation unit 808 may be coupled to the LLR output of detector 800. Similarly, switch 816 may be modeled and implemented as a 2-state multiplexer. Therefore, using comparator 814 and switch 816, the appropriate soft information for a bit position can be outputted from detector 800 based on whether the nearest neighbors are associated with symbols having the same bit value at that bit position.

It should be understood that detector 800 of FIG. 8 is merely illustrative. In the illustrated embodiment, both LLR computation unit 806 and LLR computation unit 808 may attempt to compute LLRs for each bit of a digital information sequence regardless of whether the output of unit 806 or 808 will eventually be selected. However, any other embodiment may be contemplated that allows LLR computations to be performed based on whether a bit position for each of the nearest neighbors is equal to the same bit value. For example, in some embodiments, LLR computation units 806 and 808 may be selectively enabled or powered based on the result of comparator 814. This may advantageously save power in the device, as only one of the computation units may be operating at a given time.

As described above in connection with equations (14) through (17), in some embodiments, soft information may be computed based on only one nearest neighbor, as opposed to multiple nearest neighbors. In this scenario, it may not be necessary to implement LLR computation unit 806, as the one nearest neighbor cannot have both a "0" and a "1" at any given bit position. Accordingly, the block diagram of detector 800 of FIG. 8 can be reduced down to the block diagram of detector 900 of FIG. 9 if LLR computation based on one nearest neighbor is desired. Detector 900 can include receiver 902, nearest neighbor locator 904, LLR computation unit 908, and memory 912, each of which may have any of the features and functionalities of its corresponding component in FIG. 8. In particular, receiver 902 may receive a signal corresponding to a multi-level modulation scheme that is associated with a symbol of information. Then, nearest neighbor locator 904 can find the one nearest neighbor corresponding to the received signal. Using information on the modulation scheme stored in memory 912 (e.g., values of $S_L$ or L), LLR computation unit 908 may compute soft information for each bit of the symbol based on, for example, equations (21) and (22).

Figure 10:
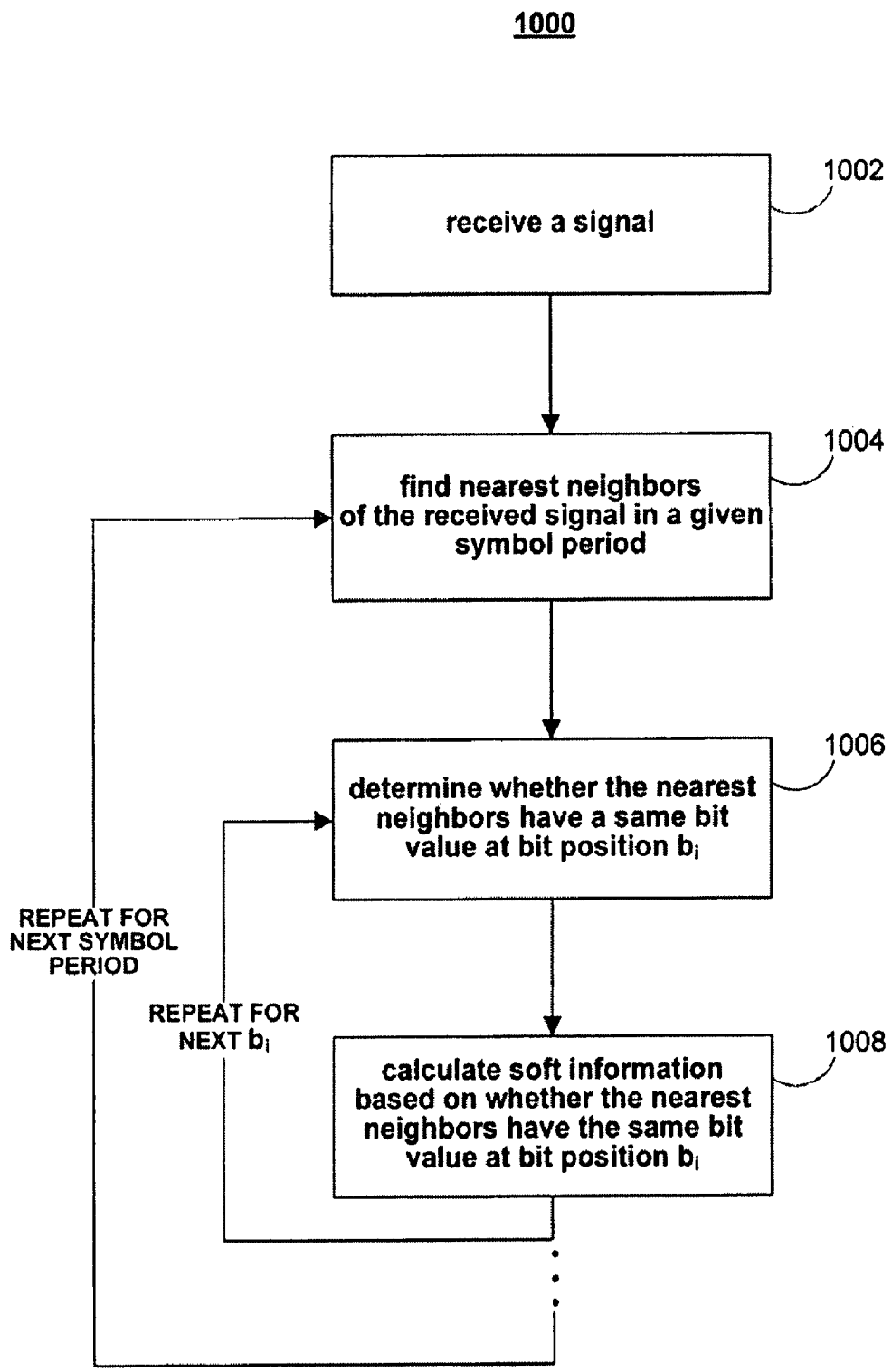
FIGS. 10 and 11 show illustrative flow diagrams for computing soft information based on nearest neighbors.

Referring now to FIG. 10, illustrative flow diagram 1000 is shown for computing soft information based on nearest neighbors of a received signal. The steps of flow diagram 1000 may be implemented by a detector, such as detector 800 of FIG. 8. At step 1002, a signal may be received (e.g., by receiver 802 of FIG. 8). The received signal may correspond to a multi-level modulation scheme (e.g., 8-PAM, $(8\text{-PAM})^2$, etc.). Thus, at each symbol period, the received signal can represent multiple bits. For example, if an 8-PAM scheme is used, the received signal at each symbol period may represent three bits of a digital information sequence.

At step 1004, a suitable number of nearest neighbors can be found for a current symbol of the digital information sequence. The nearest neighbors preferably include a subset of the signal points in a signal constellation set corresponding to the multi-level modulation scheme, where each signal point in the subset is associated with a symbol that is likely to correspond to the actual symbol that was transmitted for that symbol period. In some embodiments, such as when an AWGN channel is assumed, the nearest neighbors may correspond to constellation points closest in Euclidean distance to the value of the received signal at that symbol period. The nearest neighbors can be selected according to the method described in the above-incorporated U.S. application Ser. No. 11/929,073.

With continuing reference to FIG. 10, for a bit of the digital information sequence included in the received signal (e.g., for one of the three bits in an 8-PAM symbol), a determination can be made at step 1006 as to whether the nearest neighbors all have the same bit value at that bit position. That is, the value of all the nearest neighbors can be determined for that bit position to see whether they are all equal to "1" or "0." Based on this determination, soft information for that bit position can be calculated at step 1008 based on whether the nearest neighbors have the same bit value at the bit position.

After calculating soft information for a particular bit position, steps 1006 and 1008 can be repeated for another bit position in the same symbol. These steps may be repeated until soft information is calculated for each bit position in the symbol. Thus, for an 8-PAM scheme, where three bits are included in each symbol, steps 1006 and 1008 can be computed a total of three times. At this point, the flow of flow diagram 1000 can return to step 1004 to find the nearest neighbors associated with the next symbol period. For an 8-PAM scheme, to compute soft information for a packet of N bits, step 1004 can be performed N/3 times to find nearest neighbors for the N/3 symbols, and steps 1006 and 1008 can be performed N times (once for each bit).

It should be understood that flow diagram 1000 of FIG. 10 is merely illustrative. Any of the steps in flow diagram 1000 may be modified or rearranged, and any additional components may be added, without departing from the scope of the present invention.

Figure 11:
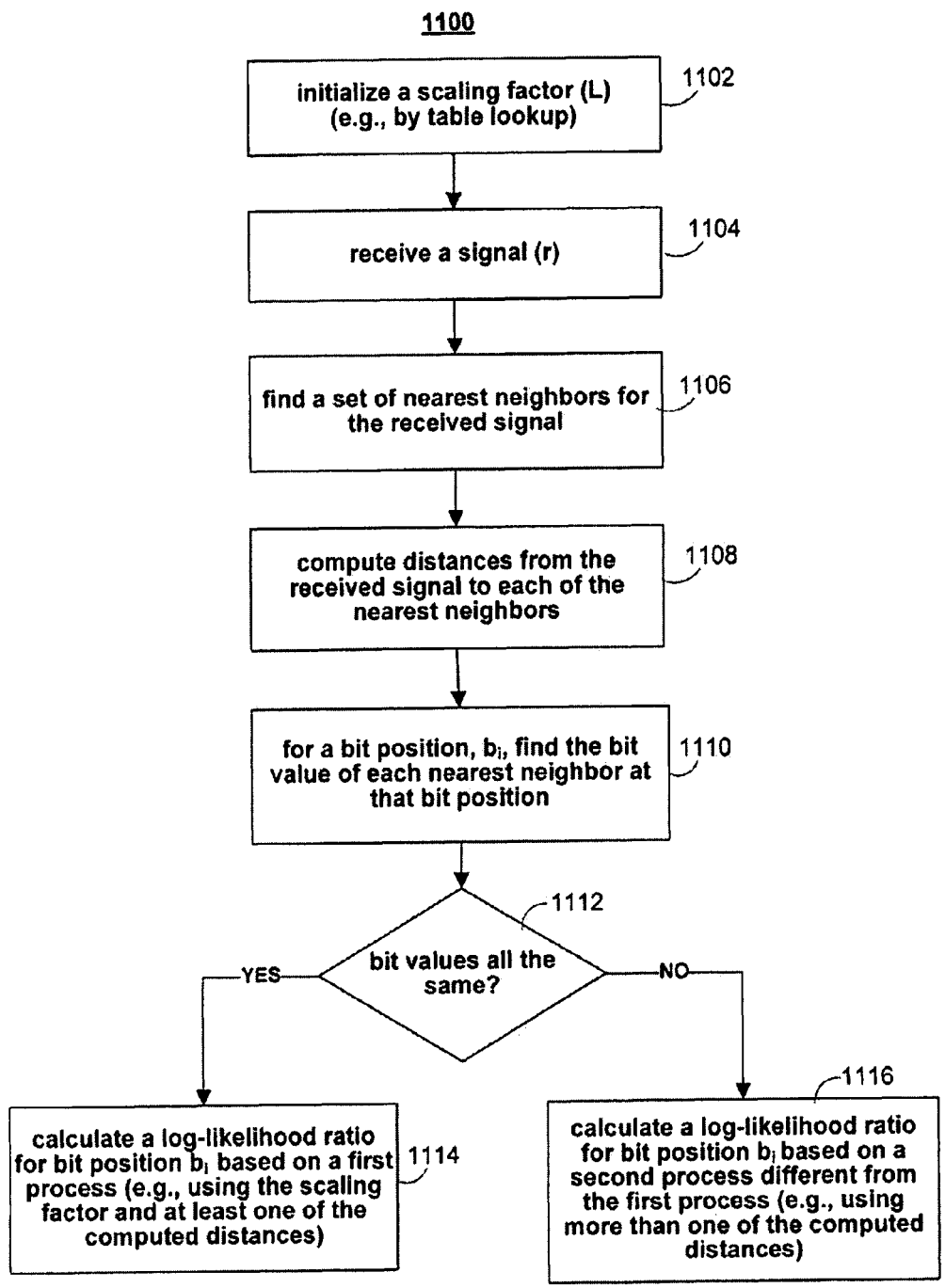

Referring now to FIG. 11, a more detailed, yet still simplified illustrative flow diagram is shown for computing soft information based on multiple nearest neighbors. Flow diagram 1100 shows simplified and illustrative steps for initializing information for calculating soft information based on a received signal, and calculating soft information based on the initialized information. It should be understood that flow diagram 1100 can be used for any suitable number of nearest neighbors. At step 1102, a scaling factor can be initialized. The scaling factor can be scaling factors L or $S_L$ described above in connection with FIG. 7 and Table 1. In some embodiments, this scaling factor may be initialized by a table lookup based on the multi-level modulation scheme used (e.g., 8-PAM, 64-QAM, etc.).

At step 1104, a signal can be received. The signal can correspond to any suitable multi-level modulation scheme, such as 8-PAM or (8-PAM)$^2$. For a symbol corresponding to a symbol period of the received signal, a set of nearest neighbor (e.g., two nearest neighbors) can be determined at step 1106. These nearest neighbors can be located in any suitable way, such as that described in the above-incorporated U.S. application Ser. No. 11/929,073. At step 1108, distances between each nearest neighbor and a signal point of the received signal can be calculated. The distance calculations may be Euclidean distance calculations, such as squared Euclidean distances.

Then, at step 1110, a bit value for a bit position, $b_i$, can be determined for each of the nearest neighbors, and at step 1112, a determination can be made as to whether the bit values of the nearest neighbors at that bit position are all the same. For the example of FIG. 6, the determination would be negative, and for the example of FIG. 7, the determination would be affirmative. If, based on this determination, the bit values are the same, at step 1114, an LLR can be computed for that bit position based on a first process. In some embodiments, the first process may use the scaling factor previously initialized at step 1102, as well as at least one of the distances previously computed at step 1108. If, based on step 1112, the bit values of the nearest neighbors at the bit position are not all the same, an LLR can be computed at step 1116 based on a second process different from the first process. The second process may use more than one of the distances previously computed at step 1108, and may not need to use the scaling factor previously initialized at step 1102.

Figure 12:
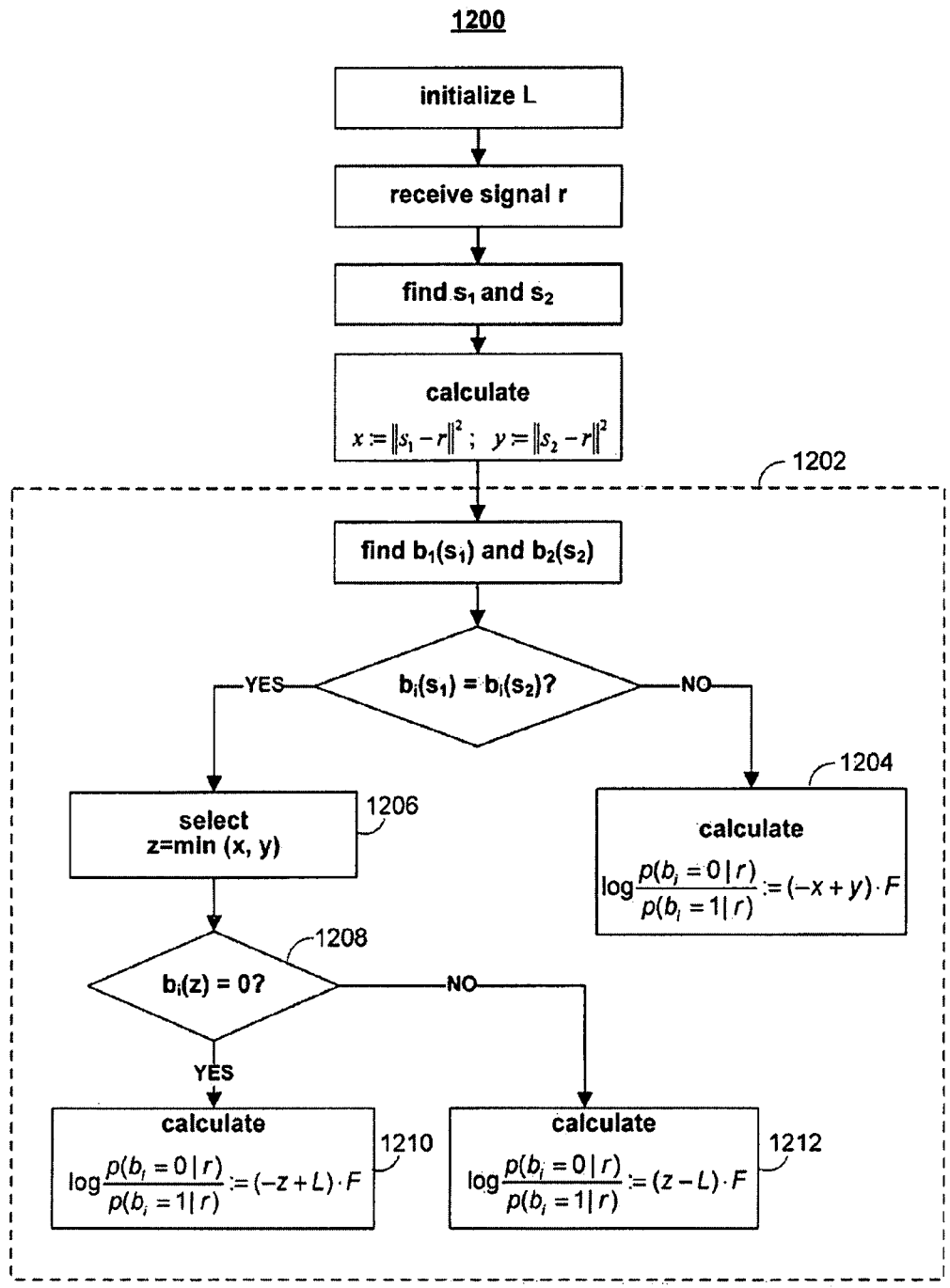
FIG. 12 shows an illustrative flow diagram based on the flow diagrams of FIGS. 10 and 11 for computing soft information based on two nearest neighbor.

FIG. 12 shows one embodiment of flow diagram 1100 (FIG. 11) for computing soft information based on at most two nearest neighbors. The steps outside of region 1202 of flow diagram 1200 correspond to initialization steps 1102, 1104, 1106, and 1108 of flow diagram 1100, and will therefore not be discussed in detail. In this embodiment, two nearest neighbors, $s_1$ and $s_2$, may be identified, and their bit values, $b_i(s_1)$ and $b_i(s_2)$, compared at a particular bit position, $b_i$. Based on this comparison, either steps 1206 through 1212 or step 1204 may be performed. Steps 1206 through 1212 represent an embodiment of the first process described above in connection with step 1114 (FIG. 11) that is performed when the nearest neighbors correspond to symbols having the same bit value at the bit position. Step 1204, on the other hand, represents an embodiment of the second process different from the first process described in connection with step 1116 (FIG. 11) that is performed when the nearest neighbors correspond to symbols having different bit values at the bit position.

Moreover, steps 1206 through 1212 illustrate one way to compute an LLR based on a predetermined scaling factor and at least one computed distances, as illustrated by step 1114. In particular, when the nearest neighbors have bit values at a bit position that are equal, a smaller of the first and the second distances can be selected at step 1206. This smaller distance may be referred to as z, which may be used, along with the scaling factor, to compute an LLR for the bit position at step 1210 or step 1212. Step 1210 and step 1212 involve computing the same expressions as those shown in equations (21) and (22) above. Also, step 1204, which is performed when the nearest neighbors have bit values at the bit position that are not equal, involves computing the same expression as that shown in equation (18) above. Thus, the steps within region 1202 in flow diagram 1200 collectively illustrate a process for computing an LLR for a bit position based on equations (18), (21) and (22), described in greater detail above.

Although arrows are not shown for iterating through different steps of flow diagram 1200, it should be understood that, like flow diagram 900, some of these steps may be iterated through multiple times. The steps within region 1202, in particular, can be repeated for each bit position of a received symbol. The steps associated with finding nearest neighbors and computing distances can be iterated through for each symbol period of the received signal.

It should also be understood that flow diagrams 1100 and 1200 of FIGS. 11 and 12 are merely illustrative. Any of the steps in flow diagrams 1100 and 1200 may be modified or rearranged, and any additional components may be added, without departing from the scope of the present invention. Also, in some embodiments, such as when a soft-decoding algorithm is used that is insensitive to LLR scaling, the LLRs computed in these flow diagrams may not be scaled by F, thereby further simplifying the LLR computation. One example of such a soft-decoding algorithm is a min-sum decoding algorithm for LDPC codes.

Figure 13:
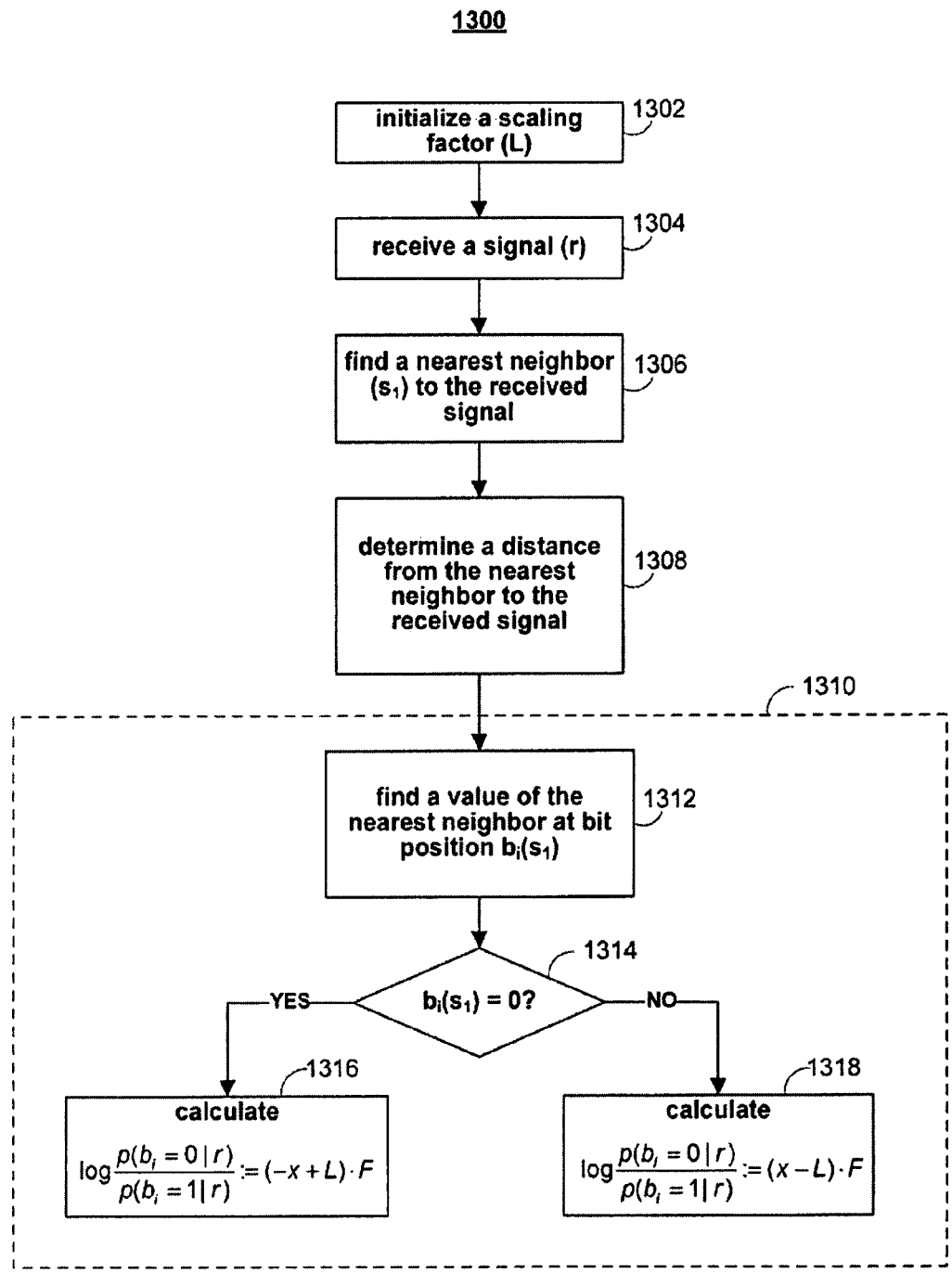
FIG. 13 shows an illustrative flow diagram for computing soft information based on one nearest neighbors.

Referring now to FIG. 13, another flow diagram is shown that illustrates an alternative embodiment for computing soft information. In particular, flow diagram 1300 is shown for computing soft information based on one nearest neighbor, and can represent steps that are executed by detector 900 of FIG. 9. First, at step 1302, a scaling factor can be initialized based on, for example, the multi-level modulation scheme currently being used. Then, at steps 1304 and 1306, a signal corresponding to the multi-level modulation scheme can be received, and its nearest neighbor can be located using any of the techniques described above. The distance between the nearest neighbor and the received signal can be determined at step 1308. Then, at step 1312, a determination can be made as to whether the bit value of the nearest neighbor for a given bit position is equal to zero. If so, the LLR for that bit position may be calculated according to the expression shown in step 1316 (e.g., equation (22)). Otherwise, an LLR may be calculated according to the expression shown in step 1318 (e.g., equation (21)). In some embodiments, such as when a soft-decoding algorithm is used that is insensitive to LLR scaling, the LLR computed at step 1316 and step 1318 may not be scaled by F.

With continuing reference to FIG. 13, the steps shown within region 1310 preferably are steps taken for each bit position in a symbol. For each symbol period of the signal received at step 1304, these steps may be repeated until an LLR has been calculated for each bit in the symbol.

It should be understood that flow diagram 1300 of FIG. 13 is merely illustrative. Any of the steps in flow diagram 1300 may be modified or rearranged, and any additional components may be added, without departing from the scope of the present invention.

Although flow diagrams 1200 and 1300 of FIGS. 10-13 relate to computing soft information for signal constellation sets that are one-dimensional (e.g., PAM) and have a constant distance between each consecutive signal point, this is merely to prevent from overcomplicating the description of the invention. It should be understood that the techniques described above can be applied to multi-dimensional signal sets by, for example, treating each dimension separately. Also, it should be understood soft information can be computed for constellation sets with non-uniform constellation sets by, for example, storing multiple scaling factors for a modulation scheme or by computing $L=S_i \cdot D$ (or another suitable equation) for each received symbol.

Figure 14:
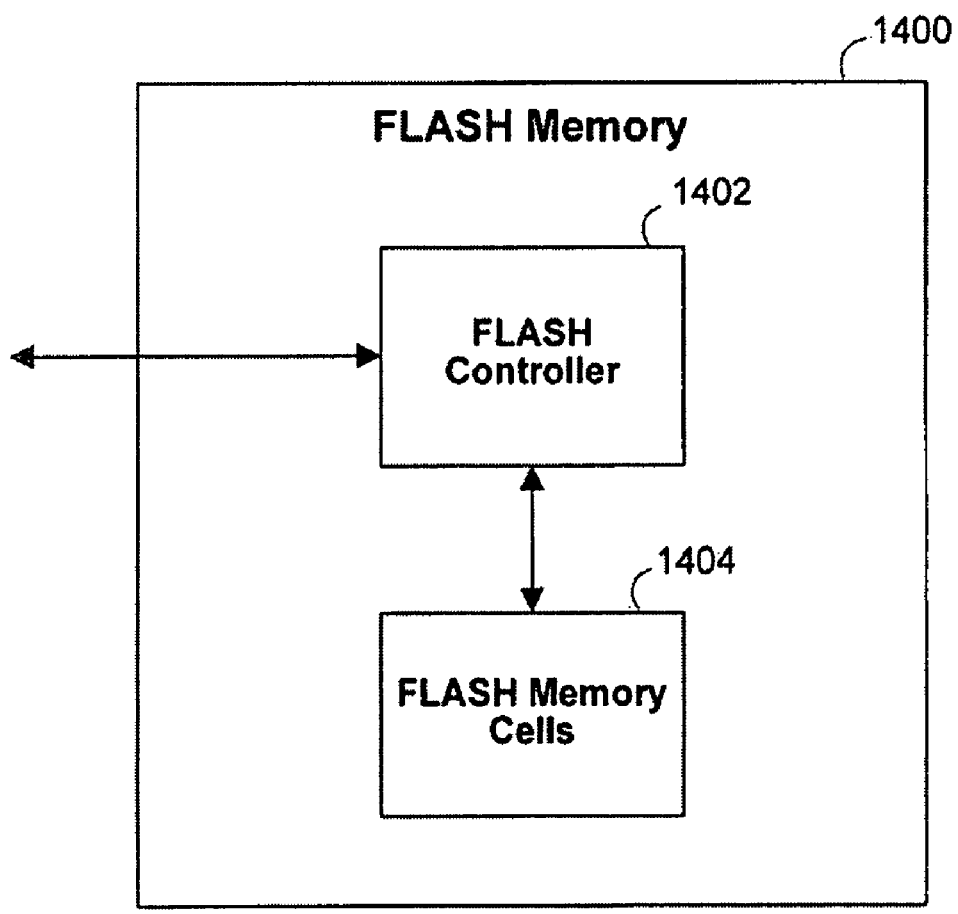
FIG. 14 is a block diagram of an exemplary FLASH memory that can employ the disclosed technology.

Referring now to FIG. 14, FLASH memory 1400 shows one system that the present invention may be implemented in. In some embodiments, FLASH memory 1400 with the disclosed technology can be included as part of any of the memory components in FIGS. 15-21 (described below). The present invention may be implemented as part of a FLASH controller, which is generally identified in FIG. 14 at 1402. FLASH controller 1402 can control (e.g., access, modify, etc.) any digital information stored in FLASH memory 1400, and can communicate with other components or devices to provide or obtain information. FLASH memory 1400 can also include FLASH memory cells 1404 for storing the digital information.

FLASH memory cells 1404 may include any suitable circuitry capable of storing digital information, such as any transistor-based storage units. In some embodiments, FLASH memory cells 1404 can store each received signal, such as received signal 110 of FIG. 1. In some embodiments, FLASH controller 1402 and FLASH memory cells 1404 can be implemented in the same package. Alternatively, they may be implemented in separate packages.

Referring now to FIGS. 15-21, various exemplary implementations of the present invention are shown.

Figure 15:
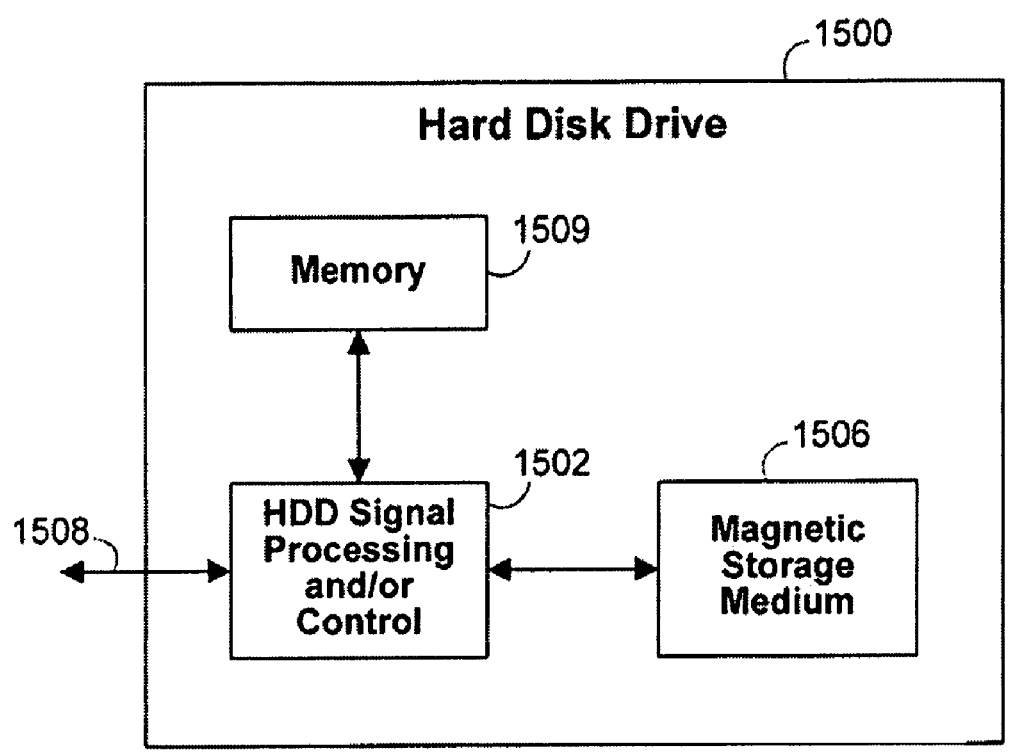
FIG. 15 is a block diagram of an exemplary hard disk drive that can employ the disclosed technology.

Referring now to FIG. 15, the present invention can be implemented in a hard disk drive 1500. The present invention may implement either or both signal processing and/or control circuits, which are generally identified in FIG. 15 at 1502. In some implementations, the signal processing and/or control circuit 1502 and/or other circuits (not shown) in the HDD 1500 may process data, perform coding and/or encryption, perform calculations, and/or format data that is output to and/or received from a magnetic storage medium 1506.

The HDD 1500 may communicate with a host device (not shown) such as a computer, mobile computing devices such as personal digital assistants, cellular phones, media or MP3 players and the like, and/or other devices via one or more wired or wireless communication links 1508. The HDD 1500 may be connected to memory 1509 such as random access memory (RAM), nonvolatile memory such as flash memory, read only memory (ROM) and/or other suitable electronic data storage.

Figure 16:
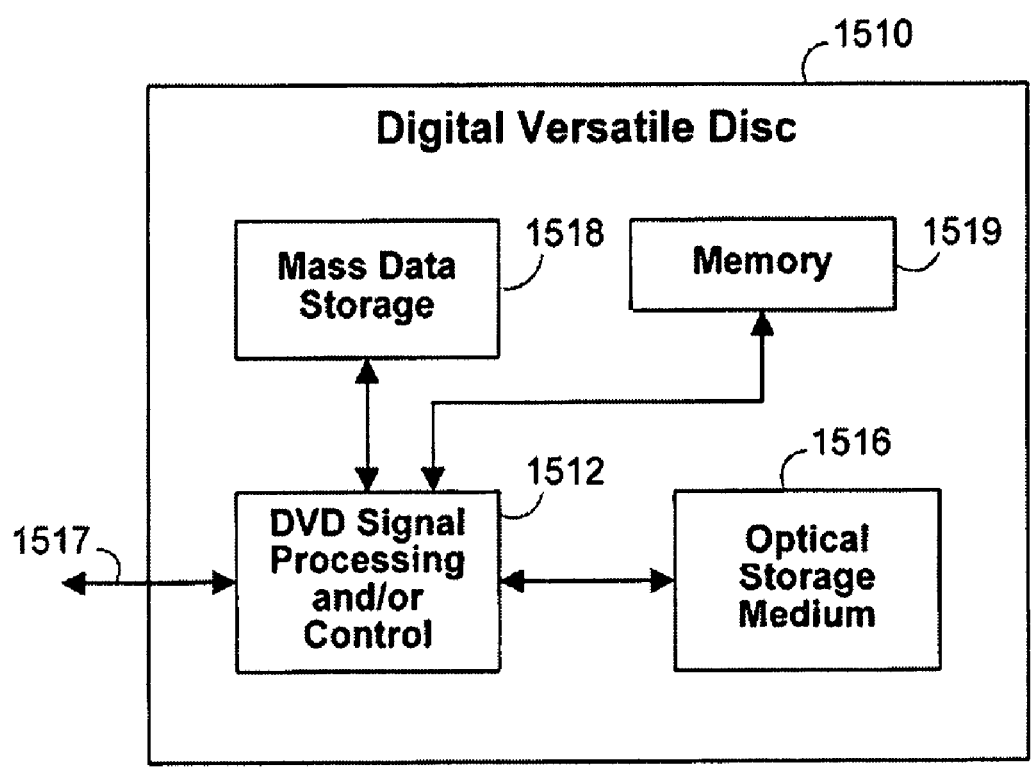
FIG. 16 is a block diagram of an exemplary digital versatile disc that can employ the disclosed technology.

Referring now to FIG. 16, the present invention can be implemented in a digital versatile disc (DVD) drive 1510. The present invention may implement either or both signal processing and/or control circuits, which are generally identified in FIG. 16 at 1512, and/or mass data storage 1518 of the DVD drive 1510. The signal processing and/or control circuit 1512 and/or other circuits (not shown) in the DVD drive 1510 may process data, perform coding and/or encryption, perform calculations, and/or format data that is read from and/or data written to an optical storage medium 1516. In some implementations, the signal processing and/or control circuit 1512 and/or other circuits (not shown) in the DVD drive 1510 can also perform other functions such as encoding and/or decoding and/or any other signal processing functions associated with a DVD drive.

The DVD drive 1510 may communicate with an output device (not shown) such as a computer, television or other device via one or more wired or wireless communication links 1517. The DVD drive 1510 may communicate with mass data storage 1518 that stores data in a nonvolatile manner. The mass data storage 1518 may include a hard disk drive (HDD). The HDD may have the configuration shown in FIG. 15. The HDD may be a mini HDD that includes one or more platters having a diameter that is smaller than approximately 1.8". The DVD drive 1510 may be connected to memory 1519 such as RAM, ROM, nonvolatile memory such as flash memory and/or other suitable electronic data storage.

Figure 17:
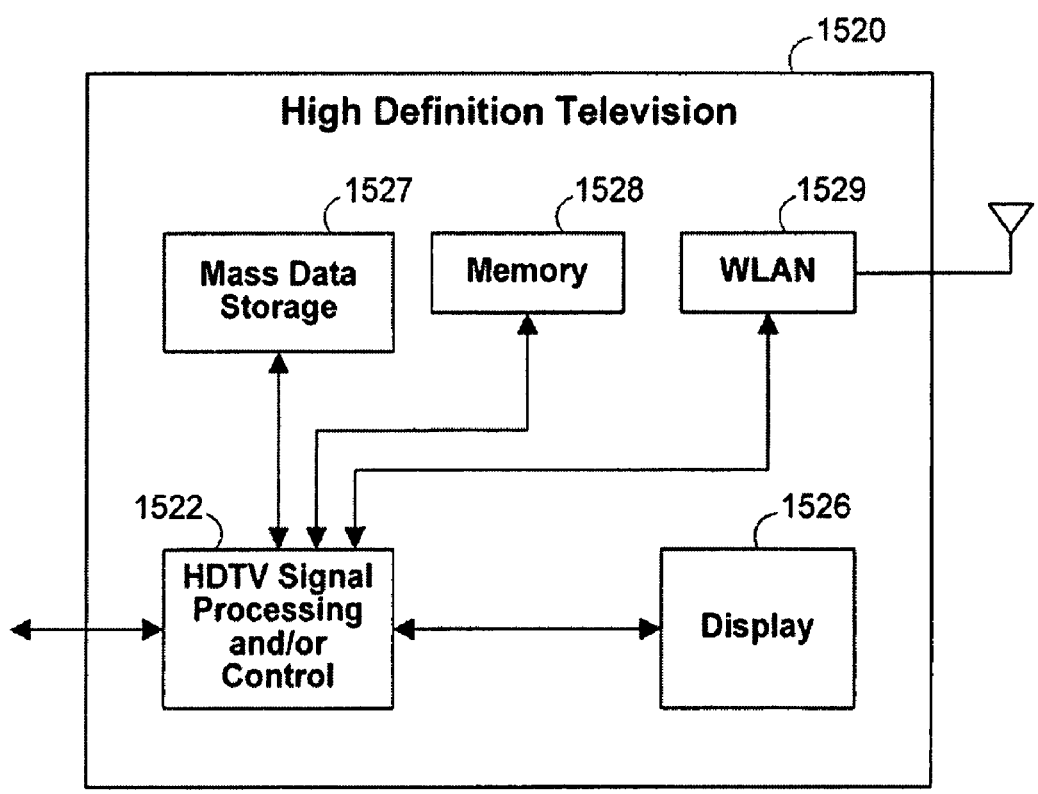
FIG. 17 is a block diagram of an exemplary high definition television that can employ the disclosed technology.

Referring now to FIG. 17, the present invention can be implemented in a high definition television (HDTV) 1520. The present invention may implement either or both signal processing and/or control circuits, which are generally identified in FIG. 17 at 1522, a WLAN interface 1529 and/or mass data storage 1527 of the HDTV 1520. The HDTV 1520 receives HDTV input signals in either a wired or wireless format and generates HDTV output signals for a display 1526. In some implementations, signal processing circuit and/or control circuit 1522 and/or other circuits (not shown) of the HDTV 1520 may process data, perform coding and/or encryption, perform calculations, format data and/or perform any other type of HDTV processing that may be required.

The HDTV 1520 may communicate with mass data storage 1527 that stores data in a nonvolatile manner such as optical and/or magnetic storage devices for example hard disk drives HDD and/or DVDs. At least one HDD may have the configuration shown in FIG. 15 and/or at least one DVD may have the configuration shown in FIG. 16. The HDD may be a mini HDD that includes one or more platters having a diameter that is smaller than approximately 1.8". The HDTV 1520 may be connected to memory 1528 such as RAM, ROM, nonvolatile memory such as flash memory and/or other suitable electronic data storage. The HDTV 1520 also may support connections with a WLAN via a WLAN network interface 1529.

Figure 18:
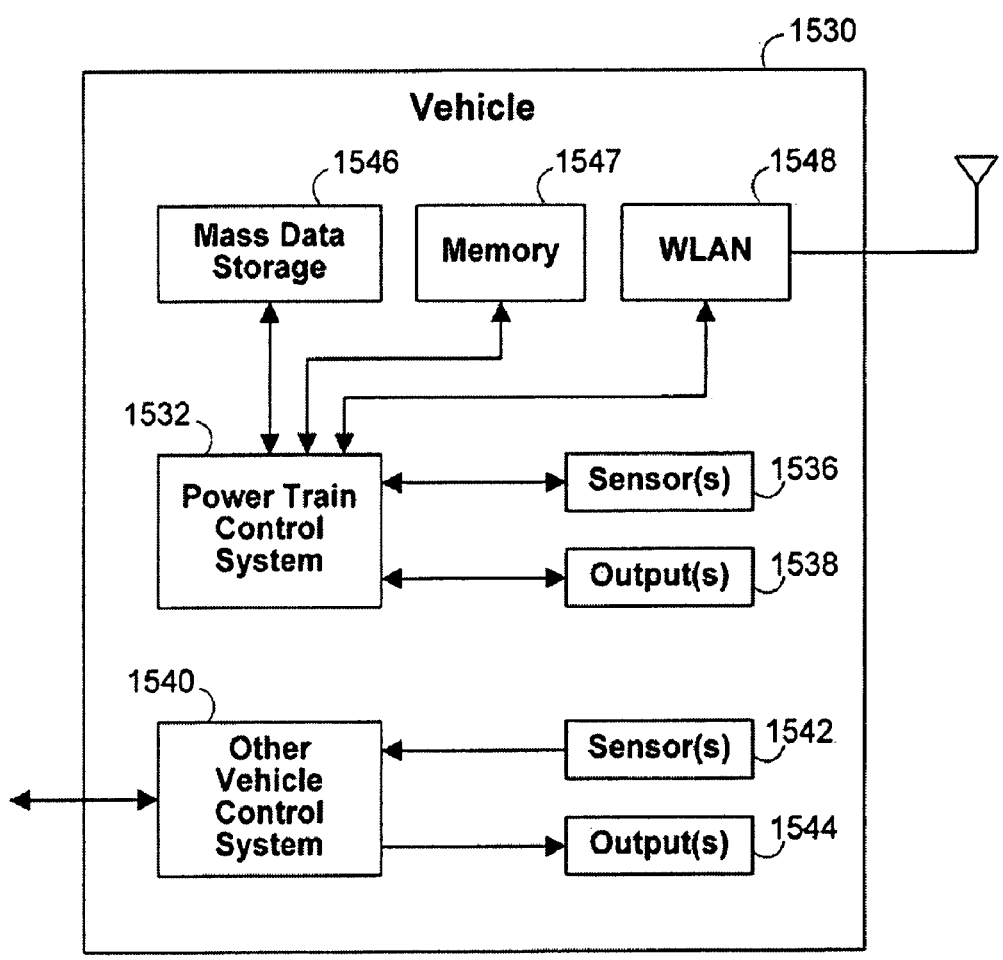
FIG. 18 is a block diagram of an exemplary vehicle that can employ the disclosed technology.

Referring now to FIG. 18, the present invention implements a control system of a vehicle 1530, a WLAN interface 1548 and/or mass data storage 1546 of the vehicle control system. In some implementations, the present invention may implement a powertrain control system 1532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1540 of the vehicle 1530. The control system 1540 may likewise receive signals from input sensors 1542 and/or output control signals to one or more output devices 1544. In some implementations, the control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1532 may communicate with mass data storage 1546 that stores data in a nonvolatile manner. The mass data storage 1546 may include optical and/or magnetic storage devices for example hard disk drives HDD and/or DVDs. At least one HDD may have the configuration shown in FIG. 15 and/or at least one DVD may have the configuration shown in FIG. 16. The HDD may be a mini HDD that includes one or more platters having a diameter that is smaller than approximately 1.8". The powertrain control system 1532 may be connected to memory 1547 such as RAM, ROM, nonvolatile memory such as flash memory and/or other suitable electronic data storage. The powertrain control system 1532 also may support connections with a WLAN via a WLAN network interface 1548. The control system 1540 may also include mass data storage, memory and/or a WLAN interface (all not shown).

Figure 19:
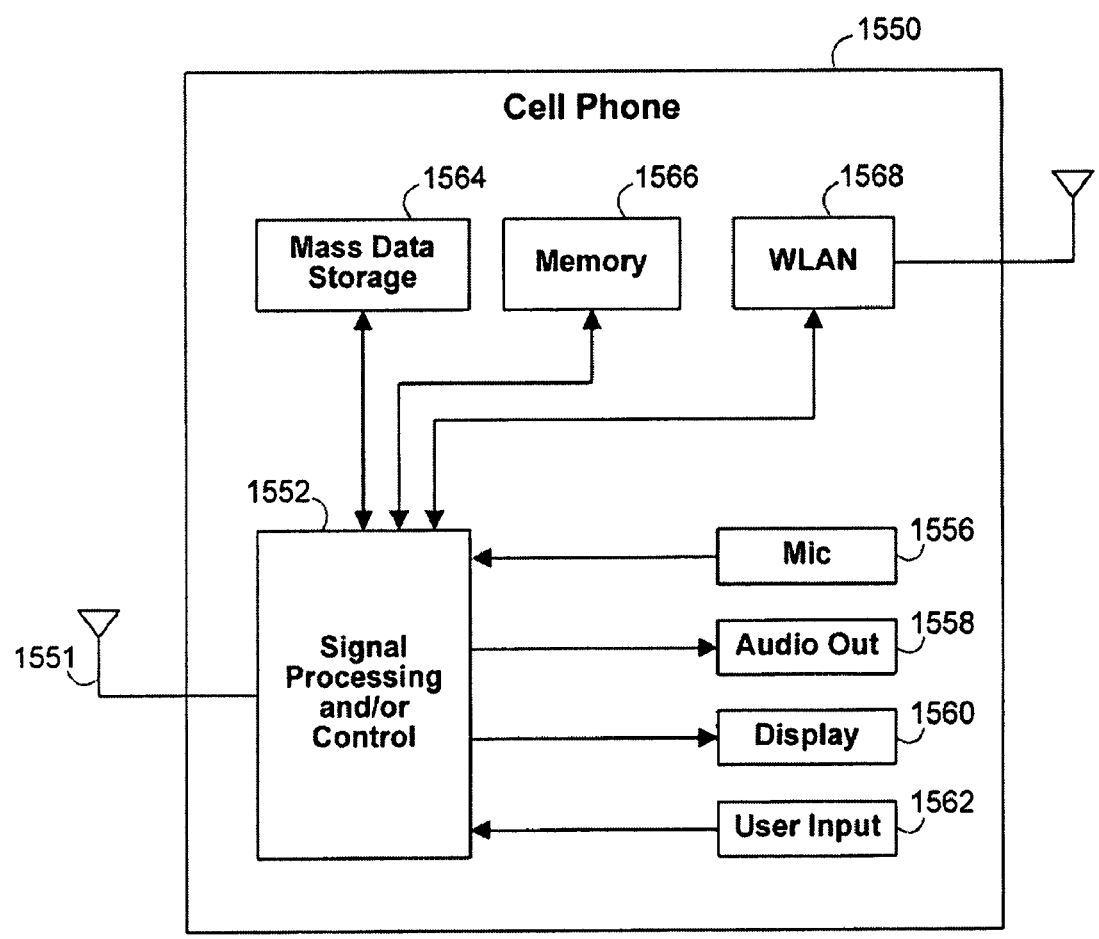
FIG. 19 is a block diagram of an exemplary cell phone that can employ the disclosed technology.

Referring now to FIG. 19, the present invention can be implemented in a cellular phone 1550 that may include a cellular antenna 1551. The present invention may implement either or both signal processing and/or control circuits, which are generally identified in FIG. 19 at 1552, a WLAN interface 1568 and/or mass data storage 1564 of the cellular phone 1550. In some implementations, the cellular phone 1550 includes a microphone 1556, an audio output 1558 such as a speaker and/or audio output jack, a display 1560 and/or an input device 1562 such as a keypad, pointing device, voice actuation and/or other input device. The signal processing and/or control circuits 1552 and/or other circuits (not shown) in the cellular phone 1550 may process data, perform coding and/or encryption, perform calculations, format data and/or perform other cellular phone functions.

The cellular phone 1550 may communicate with mass data storage 1564 that stores data in a nonvolatile manner such as optical and/or magnetic storage devices for example hard disk drives HDD and/or DVDs. At least one HDD may have the configuration shown in FIG. 15 and/or at least one DVD may have the configuration shown in FIG. 16. The HDD may be a mini HDD that includes one or more platters having a diameter that is smaller than approximately 1.8". The cellular phone 1550 may be connected to memory 1566 such as RAM, ROM, nonvolatile memory such as flash memory and/or other suitable electronic data storage. The cellular phone 1550 also may support connections with a WLAN via a WLAN network interface 1568.

Figure 20:
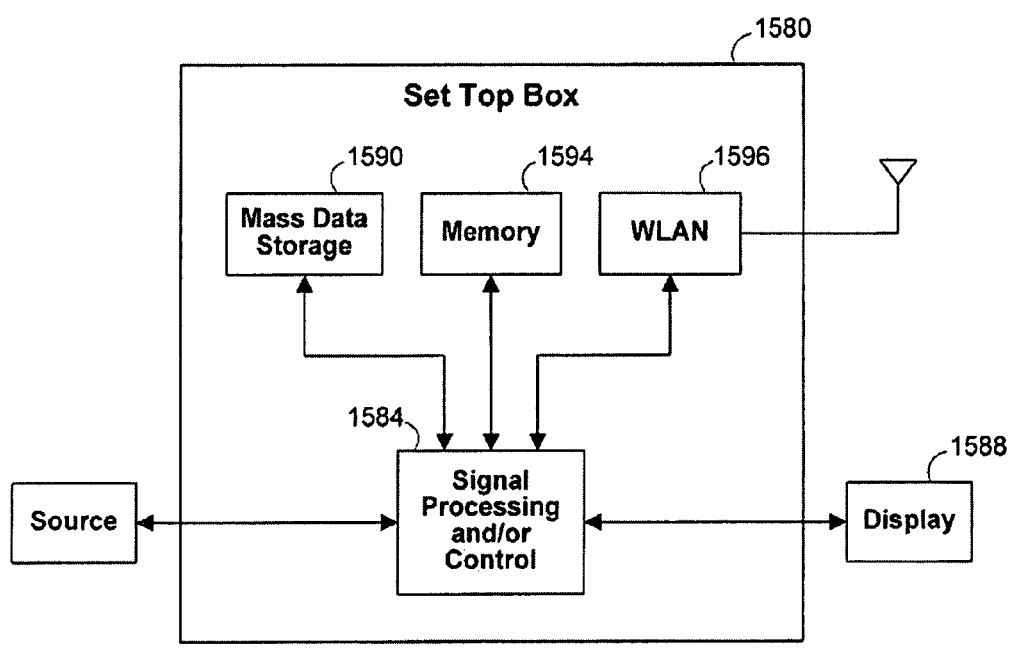
FIG. 20 is a block diagram of an exemplary set top box that can employ the disclosed technology.

Referring now to FIG. 20, the present invention can be implemented in a set top box 1580. The present invention may implement either or both signal processing and/or control circuits, which are generally identified in FIG. 20 at 1584, a WLAN interface 1596 and/or mass data storage 1590 of the set top box 1580. The set top box 1580 receives signals from a source such as a broadband source and outputs standard and/or high definition audio/video signals suitable for a display 1588 such as a television and/or monitor and/or other video and/or audio output devices. The signal processing and/or control circuits 1584 and/or other circuits (not shown) of the set top box 1580 may process data, perform coding and/or encryption, perform calculations, format data and/or perform any other set top box function.

The set top box 1580 may communicate with mass data storage 1590 that stores data in a nonvolatile manner. The mass data storage 1590 may include optical and/or magnetic storage devices for example hard disk drives HDD and/or DVDs. At least one HDD may have the configuration shown in FIG. 15 and/or at least one DVD may have the configuration shown in FIG. 16. The HDD may be a mini HDD that includes one or more platters having a diameter that is smaller than approximately 1.8". The set top box 1580 may be connected to memory 1594 such as RAM, ROM, nonvolatile memory such as flash memory and/or other suitable electronic data storage. The set top box 1580 also may support connections with a WLAN via a WLAN network interface 1596.

Figure 21:
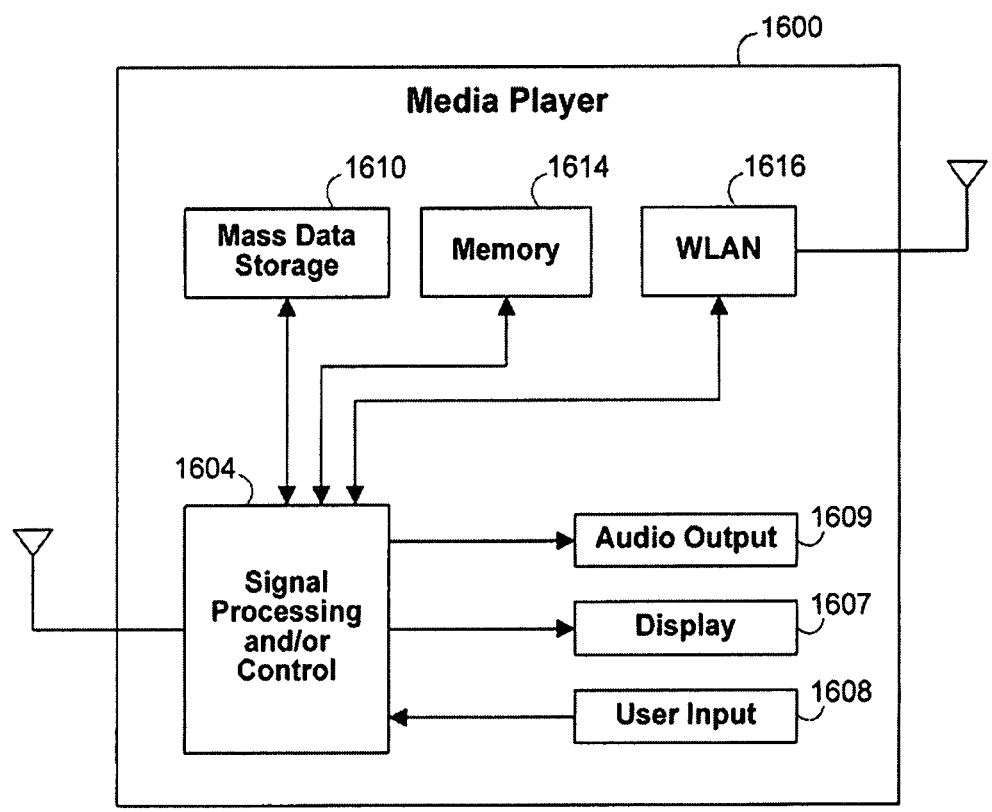
FIG. 21 is a block diagram of an exemplary media player that can employ the disclosed technology.

Referring now to FIG. 21, the present invention can be implemented in a media player 1600. The present invention may implement either or both signal processing and/or control circuits, which are generally identified in FIG. 21 at 1604, a WLAN interface 1616 and/or mass data storage 1610 of the media player 1600. In some implementations, the media player 1600 includes a display 1607 and/or a user input 1608 such as a keypad, touchpad and the like. In some implementations, the media player 1600 may employ a graphical user interface (GUI) that typically employs menus, drop down menus, icons and/or a point-and-click interface via the display 1607 and/or user input 1608. The media player 1600 further includes an audio output 1609 such as a speaker and/or audio output jack. The signal processing and/or control circuits 1604 and/or other circuits (not shown) of the media player 1600 may process data, perform coding and/or encryption, perform calculations, format data and/or perform any other media player function.

The media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 15 and/or at least one DVD may have the configuration shown in FIG. 16. The HDD may be a mini HDD that includes one or more platters having a diameter that is smaller than approximately 1.8". The media player 1600 may be connected to memory 1614 such as RAM, ROM, nonvolatile memory such as flash memory and/or other suitable electronic data storage. The media player 1600 also may support connections with a WLAN via a WLAN network interface 1616. Still other implementations in addition to those described above are contemplated.

The foregoing describes systems and methods for computing soft information based on nearest neighbors of a received symbol. Those skilled in the art will appreciate that the invention can be practiced by other than the described embodiments, which are presented for the purpose of illustration rather than of limitation.

What is claimed is:

1. A method of calculating soft information for a digital information sequence in a multi-level modulation scheme, comprising:

receiving with receiver circuitry a signal corresponding to a symbol of the digital information sequence;

finding nearest neighbors of the received signal;

determining whether the nearest neighbors correspond to symbols having a same bit value for a bit position; and calculating soft information for the bit position, wherein:

the soft information is calculated based on a first process when the nearest neighbors correspond to symbols having the same bit value for the bit position; and the soft information is calculated based on a second process different from the first process when the nearest neighbors correspond to symbols having different bit values for the bit position.

2. The method of claim 1, wherein the nearest neighbors correspond to symbols that are likely to be the symbol of the digital information sequence.

3. The method of claim 1, wherein calculating soft information comprises computing a log-likelihood ratio for the bit position.

4. The method of claim 1, wherein the first process comprises computing soft information using a predetermined scaling factor.

5. The method of claim 4, further comprising initializing the predetermined scaling factor based on the multi-level modulation scheme.

6. The method of claim 4, wherein the predetermined scaling factor is based on a distance between the nearest neighbors.

7. The method of claim 4, wherein the predetermined scaling factor is based on signal to noise ratio (SNR) in the multi-level modulation scheme.

8. The method of claim 1, wherein the first process comprises calculating soft information based on whether the same bit value is equal to zero.

9. The method of claim 1, further comprising calculating a distance from a value of the received signal to each nearest neighbor, and wherein calculating soft information comprises calculating the soft information based on at least one distance.

10. The method of claim 9, wherein the first process comprises identifying the shortest distance of the calculated distances, and wherein the soft information is calculated using the shortest distance.

11. The method of claim 9, wherein the second process comprises computing soft information for the bit position using more than one distance.

12. The method of claim 11, wherein the second process further comprises computing soft information based on an expression proportional to (y−x), and wherein x corresponds to a first distance and y corresponds to a second distance.

13. A detector for calculating soft information for a digital information sequence in a multi-level modulation scheme, comprising:
    means for receiving a signal corresponding to a symbol of the digital information sequence;
    means for finding nearest neighbors of the received signal;
    means for determining whether the nearest neighbors correspond to symbols having a same bit value for a bit position;
    means for calculating soft information for the bit position based on whether the nearest neighbors correspond to symbols having the same bit value for the bit position.

14. A detector for calculating soft information for a digital information sequence in a multi-level modulation scheme, comprising:
    a receiver for receiving a signal corresponding to a symbol of the digital information sequence;
    a nearest neighbor locator for finding nearest neighbors of the received signal;
    a comparator for determining whether the nearest neighbors correspond to symbols having a same bit value for a bit position;
    a first log likelihood ratio (LLR) computation unit for calculating soft information for the bit position when the nearest neighbors correspond to symbols having the same bit value for the bit position; and
    a second LLR computation unit different from the first LLR computation unit for calculating soft information for the bit position when the nearest neighbors correspond to symbols having different bit values for the bit position.

15. The detector of claim 14, wherein the nearest neighbors correspond to symbols that are likely to be the symbol of the digital information sequence based on a value of the received signal.

16. The detector of claim 14, wherein at least one of the first and second LLR computation units computes a log-likelihood ratio for the bit position.

17. The detector of claim 14 wherein the first LLR computation unit computes soft information using a predetermined scaling factor.

18. The detector of claim 17, further comprising a memory for storing the predetermined scaling factor.

19. The detector of claim 18, wherein the memory stores a plurality of predetermined scaling factors that correspond to different modulation schemes.

20. The detector of claim 17, wherein the predetermined scaling factor is based on a distance between the nearest neighbors.

21. The detector of claim 17, wherein the predetermined scaling factor is based on signal to noise ratio (SNR) in the multi-level modulation scheme.

22. The detector of claim 14, further comprising a distance computation unit for calculating a distance from the received signal to each nearest neighbor, and wherein at least one of the first and second LLR computation units calculates soft information for the bit position based on at least one distance.

23. The detector of claim 22, wherein the first LLR computation:
    identifies the shortest distance of the calculated distances; and
    calculates soft information based on the shortest distance.

24. The detector of claim 22, wherein the second LLR computation unit computes soft information based on an expression proportional to (y−x), and wherein x corresponds to a first distance produced by the distance computation unit and y corresponds to a second distance produced by the distance computation unit.

25. A FLASH memory comprising a FLASH controller having the detector defined in claim 14.

26. A method of calculating soft information for a digital information sequence in a multi-level modulation scheme, comprising:
    receiving with receiver circuitry a signal corresponding to a symbol of the digital information sequence;
    identifying a nearest neighbor of the received signal; and
    calculating soft information for a bit position of the symbol based on whether the nearest neighbor has a bit value of zero at that bit position, wherein calculating soft information comprises:
    calculating soft information according to a first expression when the bit value is equal to one; and
    calculating soft information according to a second expression when the bit value is equal to zero.

27. The method of claim 26, wherein the nearest neighbor is associated with a signal point in a signal constellation set for the multi-level modulation scheme that is closest in Euclidean distance to the received signal.

28. The method of claim 26, wherein the first expression is proportional to z−L and the second expression is proportional to −z+L, wherein z is a distance from the received signal to a nearest neighbor, and L is a predetermined scaling factor.

29. The method of claim 26, wherein calculating soft information comprises computing a log-likelihood ratio for the bit position.

30. The method of claim 26, wherein calculating soft information comprises computing soft information based on a predetermined scaling factor.

31. The method of claim 30, further comprising initializing the predetermined scaling factor for the multi-modulation scheme.

32. The method of claim 30, wherein the predetermined scaling factor is based on a distance between neighboring points in a signal constellation set defining the multi-level modulation scheme.

33. The method of claim 30, wherein the predetermined scaling factor is based on signal to noise ratio (SNR) in the multi-level modulation scheme.

34. The method of claim 26, further comprising computing a distance between the received signal and the nearest neighbor, and wherein calculating soft information comprises calculating soft information using the computed distance.

35. A detector for calculating soft information for a digital information sequence in a multi-level modulation scheme, comprising:
 a receiver for receiving a signal corresponding to a symbol of the digital information sequence;
 a nearest neighbor locator for identifying a nearest neighbor of the received signal; and
 an log likelihood ratio (LLR) computation unit for calculating soft information for a bit position of the symbol based on whether the nearest neighbor has a bit value of zero at that bit position, wherein the LLR computation unit:
 calculates soft information according to a first expression when the bit value is equal to one; and
 calculates soft information according to a second expression when the same bit value is equal to zero.

36. The detector of claim 35, wherein the nearest neighbor is associated with a signal point in a signal constellation set for the multi-level modulation scheme that is closest in Euclidean distance to the received signal.

37. The detector of claim 35, wherein the first expression is proportional to $z-L$ and the second expression is proportional to $-z+L$, wherein $z$ is a distance from the received signal to a nearest neighbor, and $L$ is a predetermined scaling factor.

38. The detector of claim 35, wherein the LLR computation unit calculates a log-likelihood ratio for the bit position.

39. The detector of claim 35, wherein the LLR computation unit computes soft information based on a predetermined scaling factor.

40. The detector of claim 39, further comprising a memory for storing the predetermined scaling factor.

41. The detector of claim 40 wherein the memory stores a plurality of predetermined scaling factors that correspond to different modulation schemes.

42. The detector of claim 39, wherein the predetermined scaling factor is based on a distance between neighboring points in a signal constellation set defining the multi-level modulation scheme.

43. The detector of claim 39, wherein the predetermined scaling factor is based on signal to noise ratio (SNR) in the multi-level modulation scheme.

44. The detector of claim 35, further comprising a distance computation unit for computing a distance between the received signal and the nearest neighbor, and wherein the LLR computation unit calculates soft information using the computed distance.

45. A FLASH memory comprising a FLASH controller having the detector defined in claim 35.

* * * * *